United States Patent
Na et al.

(10) Patent No.: US 9,207,792 B2
(45) Date of Patent: Dec. 8, 2015

(54) MOBILE APPARATUS HAVING HAND WRITING FUNCTION USING MULTI-TOUCH AND CONTROL METHOD THEREOF

(71) Applicant: Samsung Electronics Co. Ltd., Suwon-si, Gyeonggi-do (KR)

(72) Inventors: Seok-Hee Na, Incheon (KR); Ying Dong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/010,914

(22) Filed: Aug. 27, 2013

(65) Prior Publication Data

US 2014/0056523 A1     Feb. 27, 2014

(30) Foreign Application Priority Data

Aug. 27, 2012  (KR) .................. 10-2012-0093945

(51) Int. Cl.
   *G06K 9/00*     (2006.01)
   *G06F 3/041*    (2006.01)
   *G06F 3/0488*   (2013.01)

(52) U.S. Cl.
   CPC .............. *G06F 3/041* (2013.01); *G06F 3/0488* (2013.01); *G06F 2203/04808* (2013.01)

(58) Field of Classification Search
   None
   See application file for complete search history.

(56) References Cited

U.S. PATENT DOCUMENTS

| | | | | |
|---|---|---|---|---|
| 8,166,421 B2* | 4/2012 | Magal et al. | ............... | 715/863 |
| 8,526,767 B2* | 9/2013 | Bowens | .................. | 382/315 |
| 2012/0131502 A1* | 5/2012 | Bock et al. | ............. | 715/808 |
| 2012/0162105 A1* | 6/2012 | Sakurai | .................. | 345/173 |
| 2012/0229450 A1* | 9/2012 | Kim et al. | ............... | 345/419 |
| 2012/0235936 A1* | 9/2012 | Yeh et al. | ............... | 345/173 |
| 2012/0249472 A1* | 10/2012 | Hong et al. | ............. | 345/174 |
| 2012/0274573 A1* | 11/2012 | Hwang | .................. | 345/171 |
| 2012/0274585 A1* | 11/2012 | Telfer et al. | ............. | 345/173 |
| 2012/0280929 A1* | 11/2012 | Rimon et al. | ............ | 345/173 |
| 2013/0082966 A1* | 4/2013 | Hsieh et al. | ............. | 345/173 |
| 2013/0162544 A1* | 6/2013 | Yang et al. | ............. | 345/173 |
| 2013/0194226 A1* | 8/2013 | Benhamouda | ......... | 345/174 |
| 2013/0290761 A1* | 10/2013 | Moon et al. | ............. | 713/323 |
| 2013/0328617 A1* | 12/2013 | Liu et al. | ................. | 327/517 |

FOREIGN PATENT DOCUMENTS

| | | |
|---|---|---|
| KR | 10-2010-0045617 A | 5/2010 |
| KR | 10-2011-0002552 A | 1/2011 |

OTHER PUBLICATIONS

Hwang et al. "Development and Evaluation of Multi-touch based Korean Inputting System", uninventor.com/projects/papers/KoeanShaper_kor.pdf, Jun. 2011.*
"Free real time online Katakana to Hiragana Online converter", www.ltool.net. Sep. 2011.*
"Simplified to Traditional-Free online Tools :converter", www.chinese-tools.com, Feb. 2005.*

* cited by examiner

*Primary Examiner* — Randolph I Chu
(74) *Attorney, Agent, or Firm* — Jefferson IP Law, LLP

(57) ABSTRACT

A method of controlling a mobile apparatus having a hand writing function using a multi touch includes detecting a hand writing input that is input to a hand writing input window on a touch screen of the mobile apparatus, determining whether the detected hand writing input is a multi touch input or a single touch input, generating a hand writing output including multi touch output corresponding to the multi touch input and single touch output corresponding to the single touch input; and displaying the hand writing output in an output window on the touch screen.

22 Claims, 17 Drawing Sheets

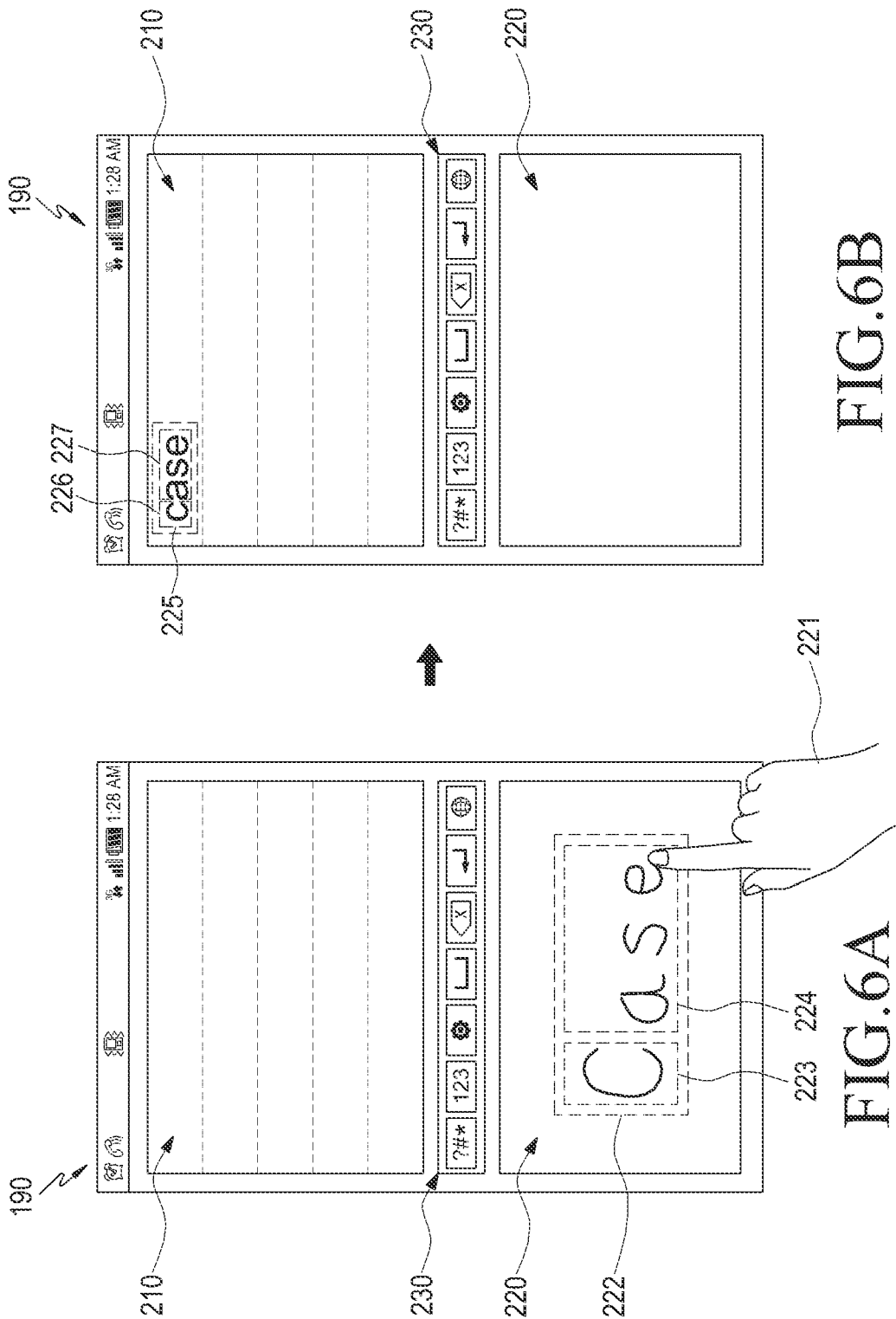

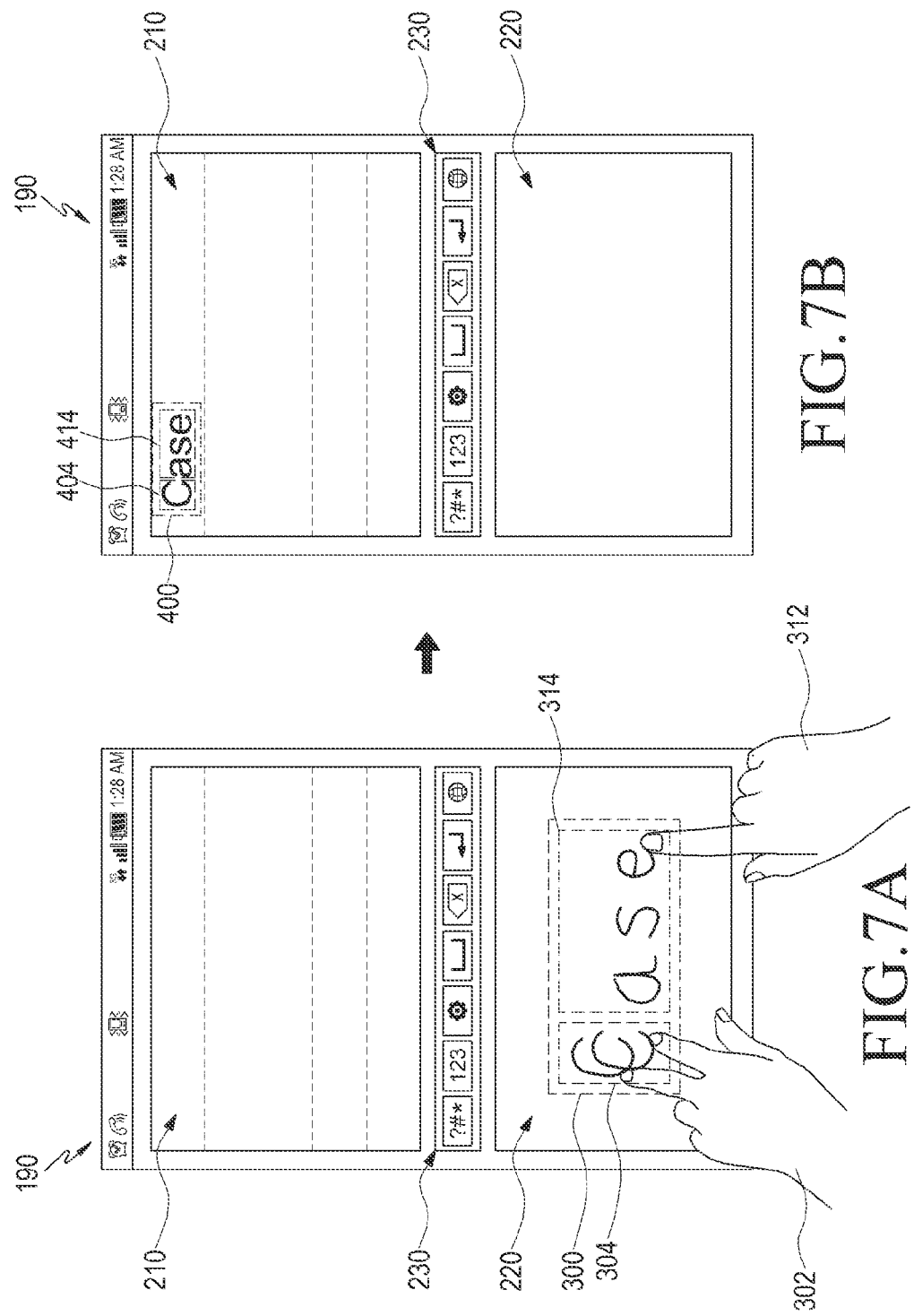

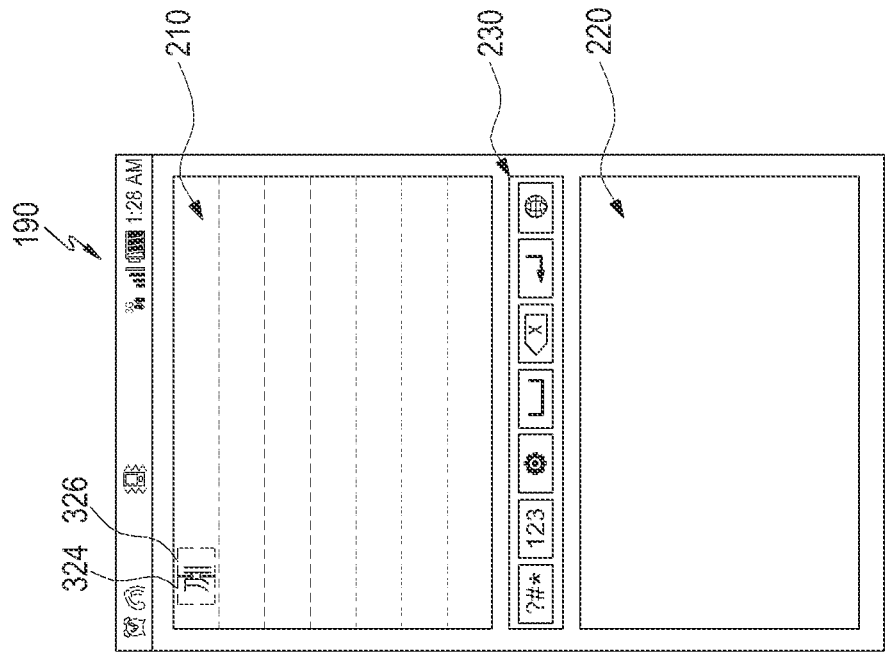
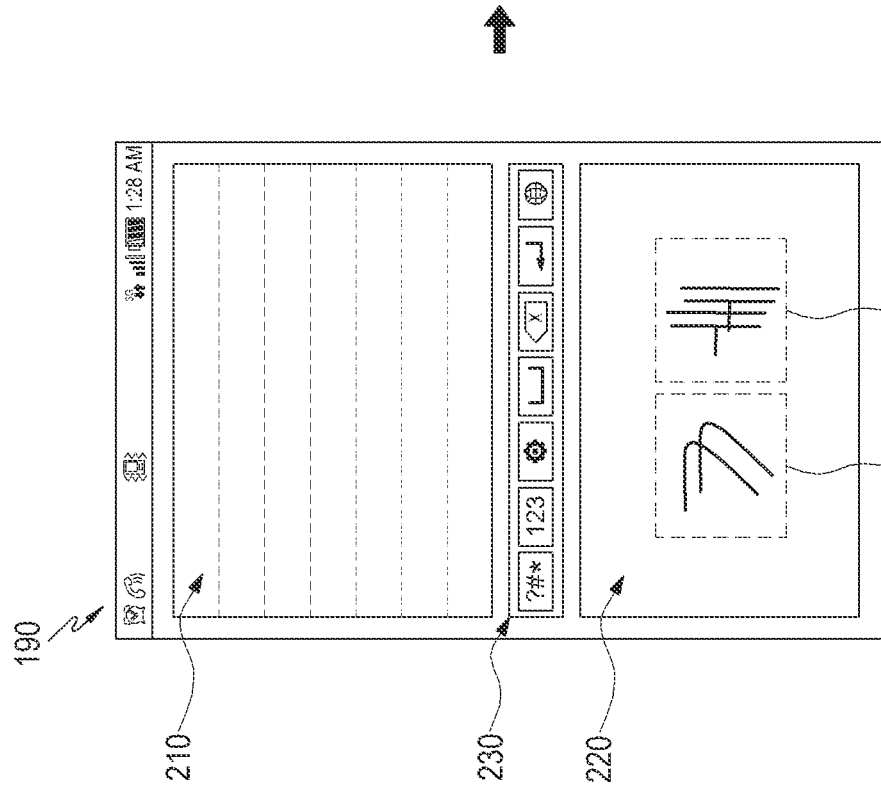
FIG.8B
FIG.8A

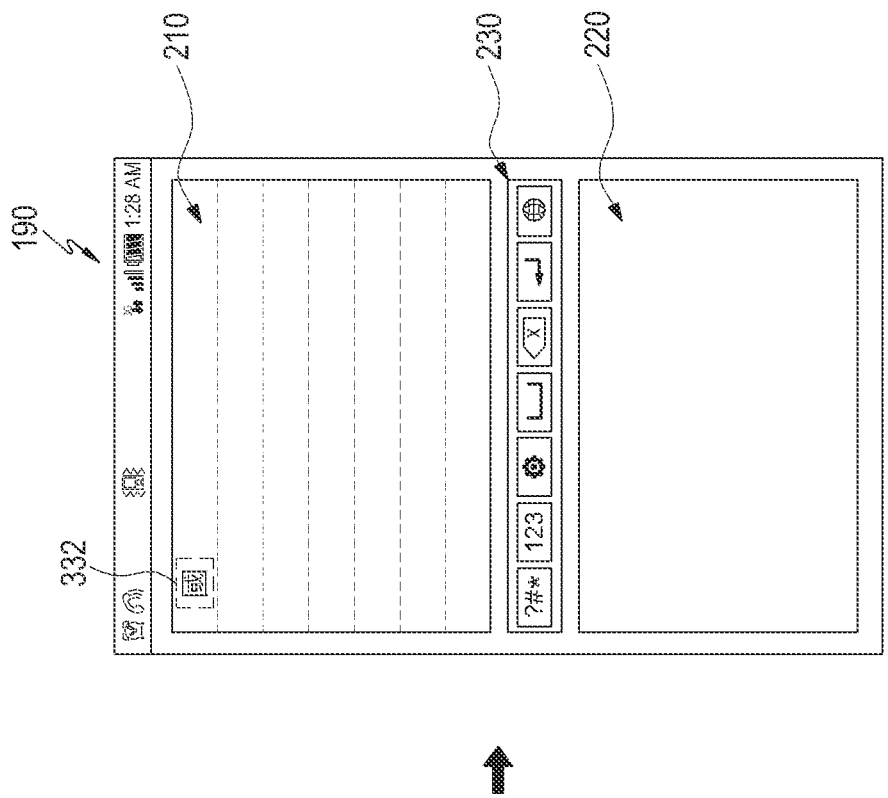
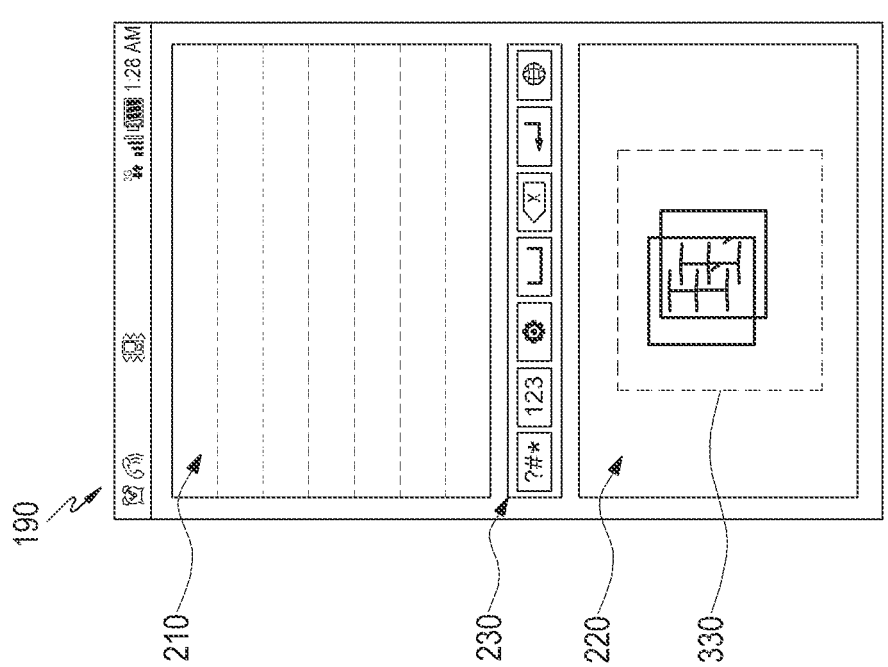
FIG.9B
FIG.9A

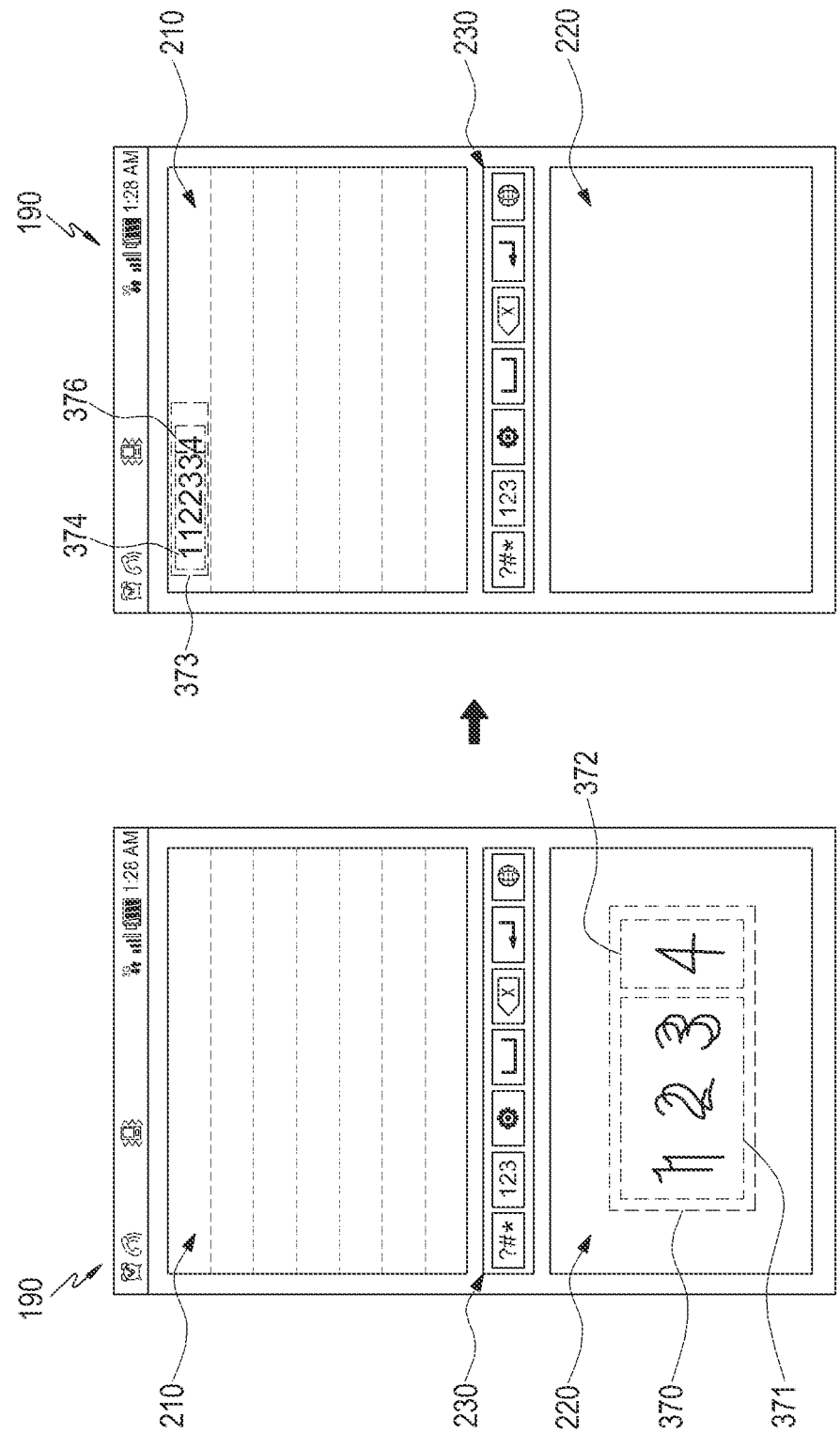

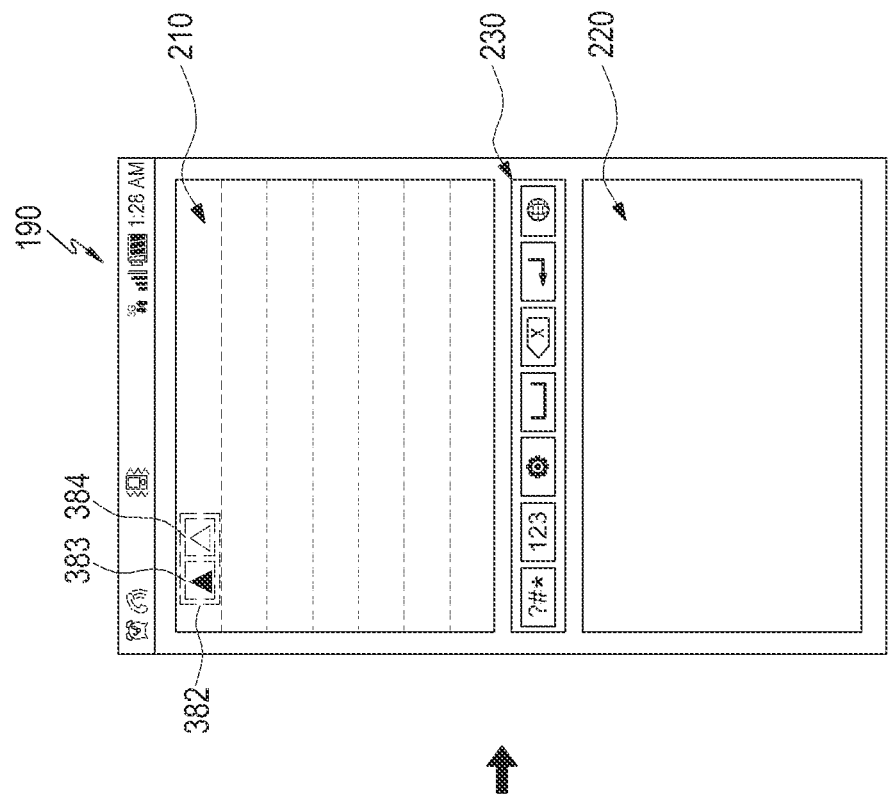
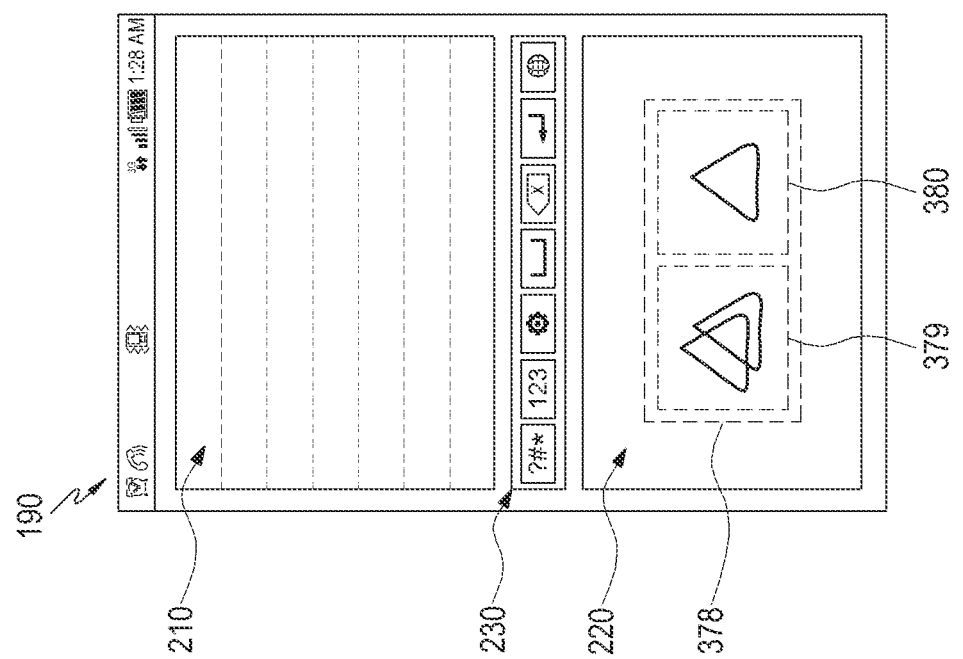
FIG.12B
FIG.12A

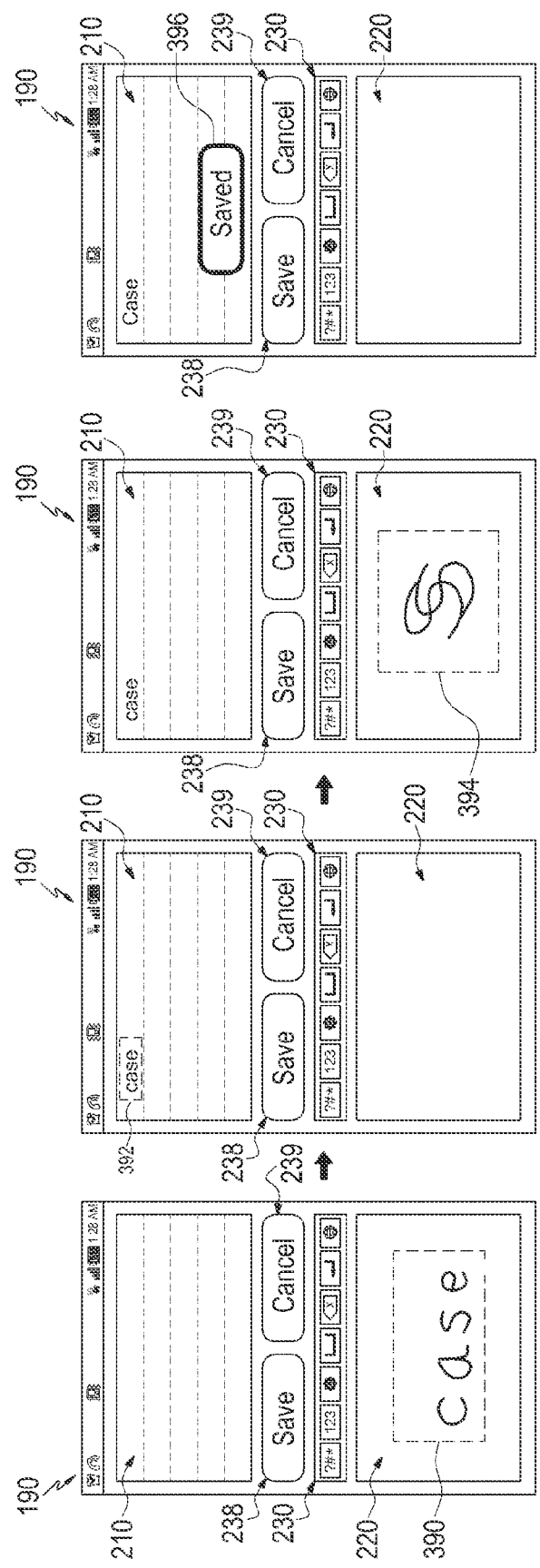

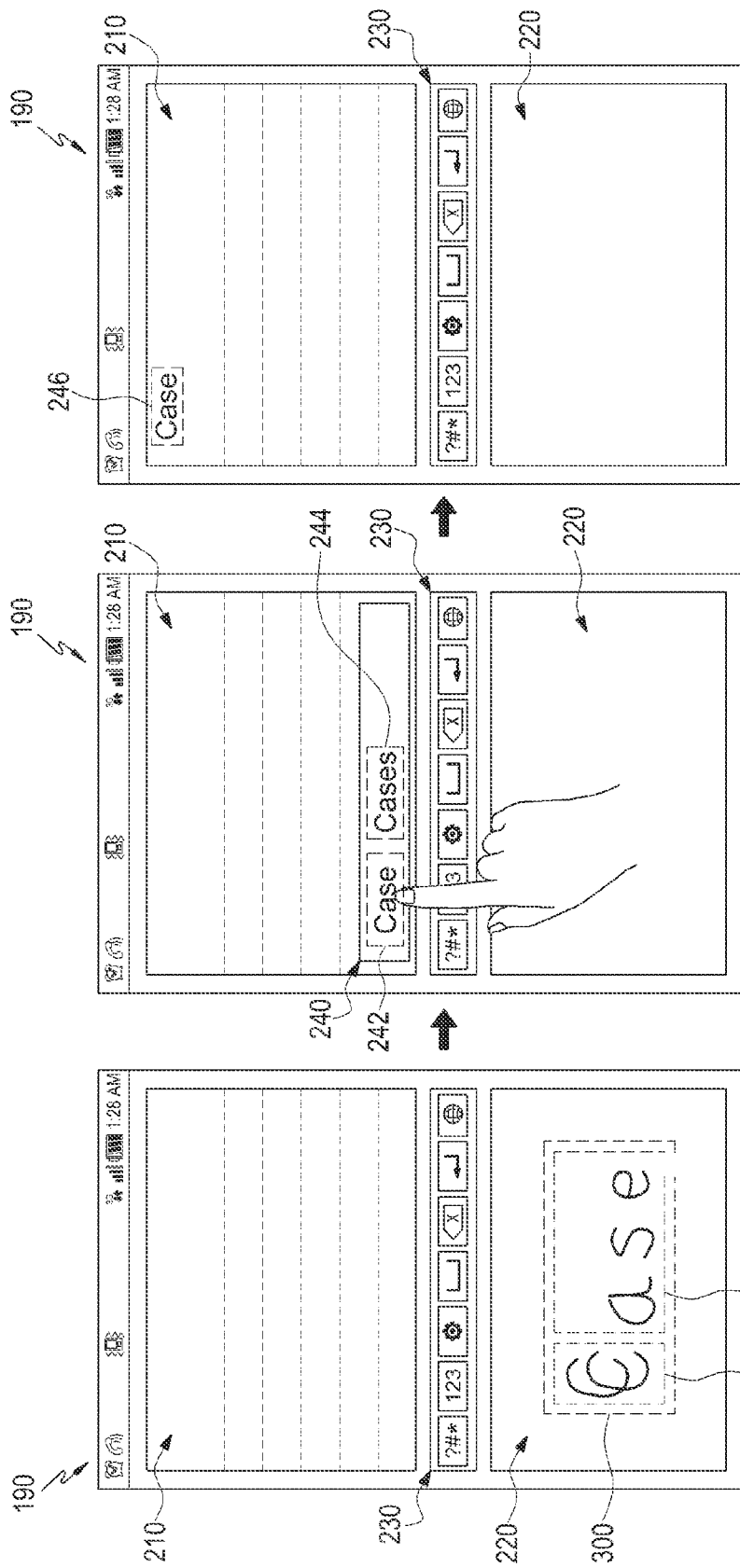

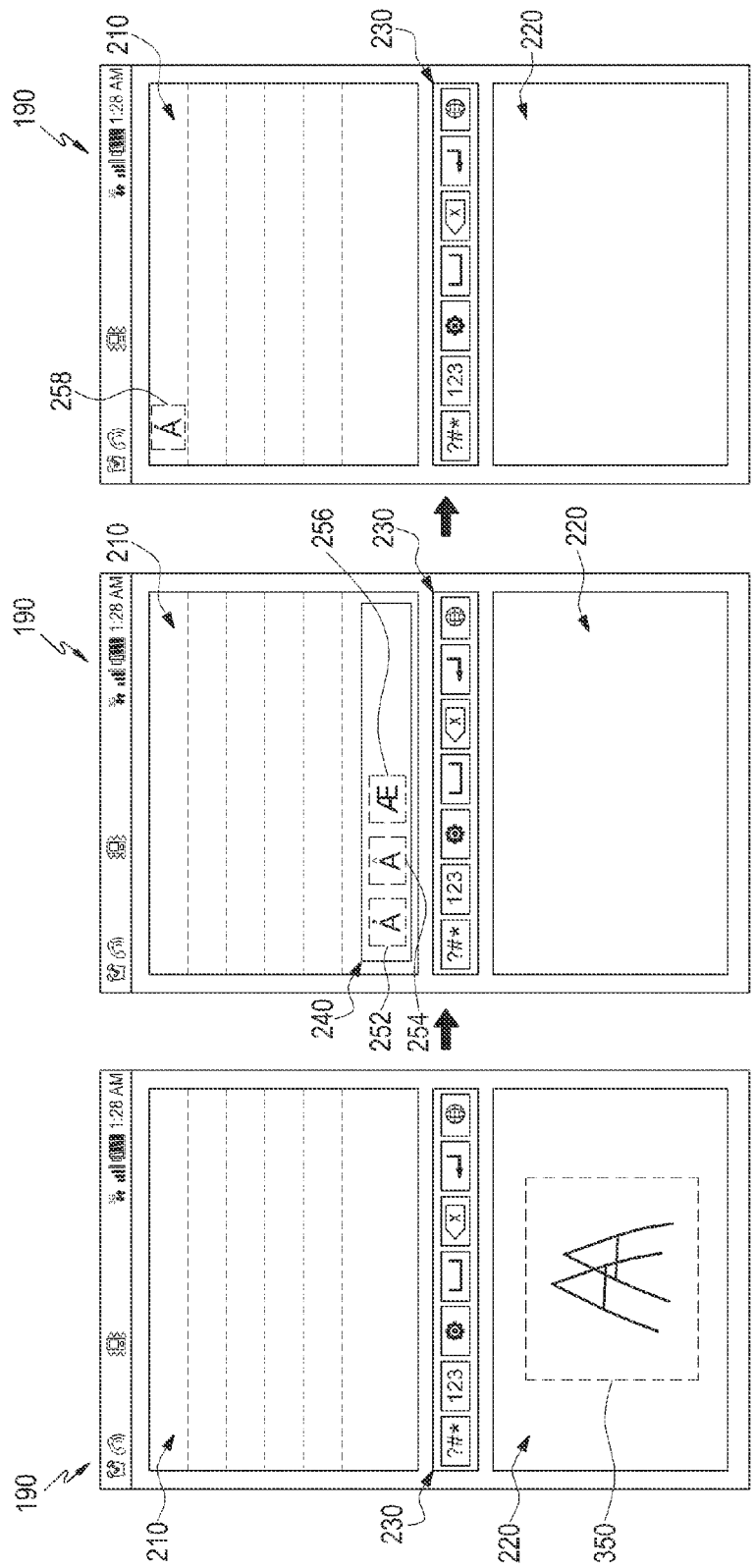

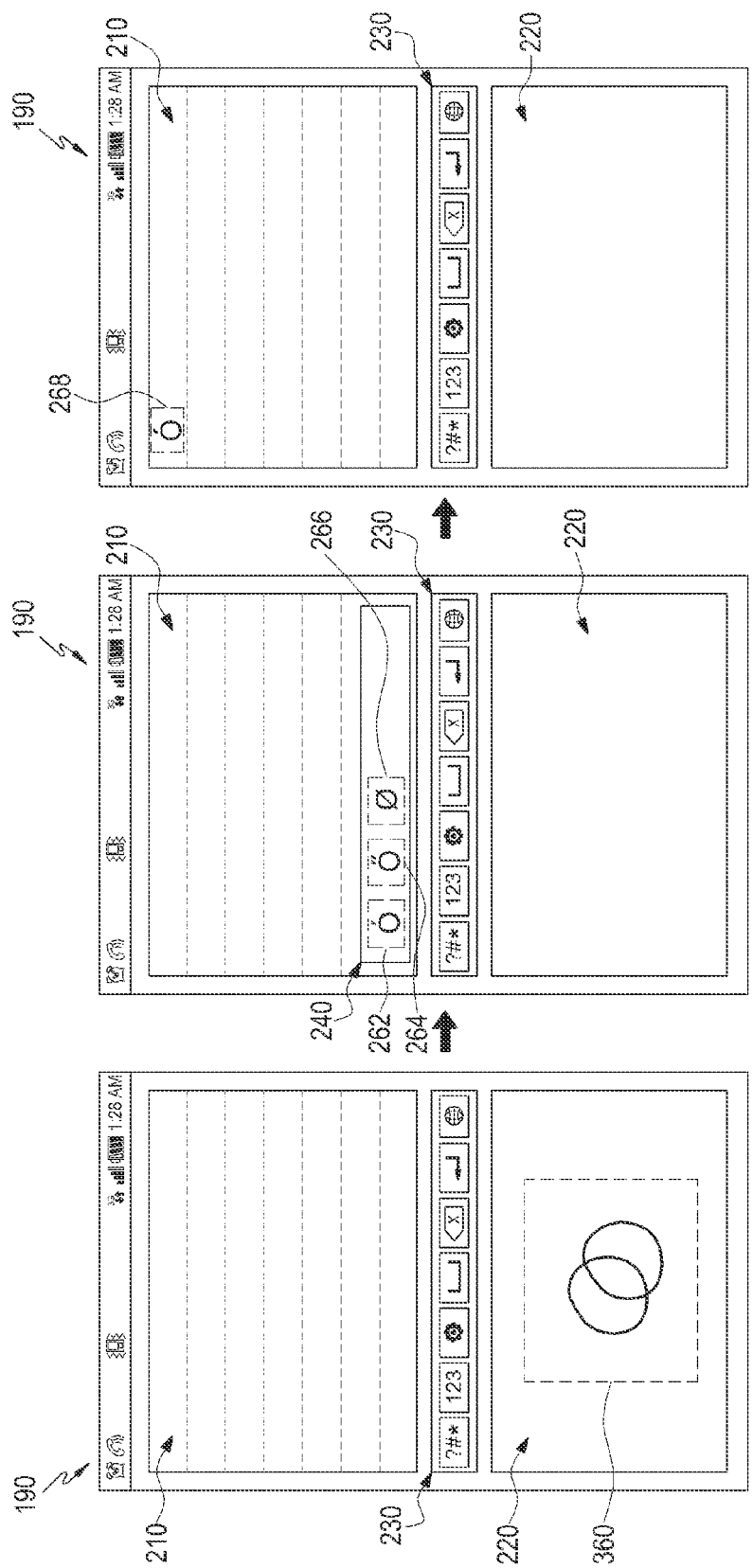

MOBILE APPARATUS HAVING HAND WRITING FUNCTION USING MULTI-TOUCH AND CONTROL METHOD THEREOF

PRIORITY

This application claims the benefit under 35 U.S.C. §119 (a) of a Korean patent application filed on Aug. 27, 2012 in the Korean Intellectual Property Office and assigned Serial No. 10-2012-0093945, the entire disclosure of which is hereby incorporated by reference.

BACKGROUND OF THE INVENTION

1. Field of the Invention

The present invention relates to a technology of a mobile apparatus and a control method thereof. More particularly, the present invention relates to a mobile apparatus for providing a hand writing function using a multi-touch and a control method thereof, and relates to a technology for improving recognition of hand writing.

2. Description of the Related Art

The development of a technology for a mobile apparatus has correspondingly resulted in development of a technology for a method of inputting characters in the mobile apparatus. The method of inputting characters in the mobile apparatus includes a method of inputting characters by using a keypad. For example, a character may be input in the mobile apparatus by detecting that a keypad mounted in the mobile apparatus is pressed.

Further, a technology for a touch screen has been recently developed. Accordingly, there exists a technology for inputting characters in a mobile apparatus by using the touch screen. For example, a virtual keypad may be displayed on the touch screen. Characters may be input in the mobile apparatus by detecting a touch of the display virtual keypad.

In the meantime, a writing recognition technology related to a character input method has been recently developed. The writing recognition technology corresponds to a technology for, when a user inputs hand writing in the touch screen by a touch, analyzing the touch, generating a character which the user desires to input, and inputting the generated character in a mobile apparatus using the touch screen technology.

However, a shape of a character which the user desires to input is highly variable. As such, when the mobile apparatus analyzes the touched hand writing on the touch screen, there are many cases in which a character different from the character which the user desires to input is recognized. In particular, when a character being input is similar to a specific character but is of a different size, the ability of the mobile apparatus to recognize characters is extremely decreased. For example, in a case of the English alphabet, a small letter "c" and a capital letter "C" have the same shape, but are of different sizes, so that recognition is extremely decreased. Further, even in a case of a character additionally including only a point, such as, for example, an apostrophe or a period, compared to a specific character, the ability of the mobile apparatus to recognize such a character is extremely decreased.

Therefore, a need exists for an apparatus, system, and method for having a function of hand writing using a multi-touch and a control method thereof, which generates multi-touch output corresponding to multi-touch input to output hand writing.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a mobile apparatus having a function of hand writing using a multi-touch and a control method thereof, which generates multi-touch output corresponding to multi-touch input to output hand writing.

In accordance with an aspect of the present invention, a method of controlling a mobile apparatus having a hand writing function using a multi touch is provided. The method includes detecting a hand writing input that is input to a hand writing input window on a touch screen of the mobile apparatus, determining whether the detected hand writing input is a multi touch input or a single touch input, generating a hand writing output including multi touch output corresponding to the multi touch input and single touch output corresponding to the single touch input, and displaying the hand writing output in an output window on the touch screen.

In accordance with another aspect of the present invention, a mobile apparatus having a hand writing function using a multi touch is provided. The mobile apparatus includes a touch screen for displaying an image, and a controller for detecting a hand writing input that is input to a hand writing input window on the touch screen, for determining whether the detected hand writing input is a multi touch input or a single touch input, for generating a hand writing output including multi touch output corresponding to the multi touch input and single touch output corresponding to the single touch input, and for displaying the hand writing output in an output window on the touch screen.

The mobile apparatus having the function of hand writing using a multi-touch and the control method thereof according to exemplary embodiments of the present invention have an advantage of generating multi-touch output corresponding to multi-touch input to output hand writing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which:

FIGS. 6A and 6B are diagrams illustrating a comparative example of mobile apparatuses having a hand writing function;

FIGS. 7A and 7B are diagrams illustrating a screen of a mobile apparatus according to an exemplary embodiment of the present invention;

FIGS. 8A and 8B are diagrams illustrating a first example of a method of controlling a mobile apparatus having a hand writing function using a multi-touch according to an exemplary embodiment of the present invention;

FIGS. 9A and 9B are diagrams illustrating a second example of a method of controlling a mobile apparatus having a hand writing function using a multi-touch according to an exemplary embodiment of the present invention;

FIGS. 11A and 11B are diagrams illustrating a fourth example of a method of controlling a mobile apparatus having a hand writing function using a multi-touch according to an exemplary embodiment of the present invention;

FIGS. 12A and 12B are diagrams illustrating a fifth example of a method of controlling a mobile apparatus having a hand writing function using a multi-touch according to an exemplary embodiment of the present invention;

FIGS. 13A and 13D are diagrams illustrating a sixth example of a method of controlling a mobile apparatus having a hand writing function using a multi-touch according to an exemplary embodiment of the present invention;

FIGS. 15A to 15C are diagrams illustrating a screen of a mobile apparatus according to an exemplary embodiment of the present invention;

FIGS. 16A to 16C are diagrams illustrating a seventh example of a method of controlling a mobile apparatus having a hand writing function using a multi-touch according to an exemplary embodiment of the present invention; and FIGS. 17A to 17C are diagrams illustrating an eighth example of a method of controlling a mobile apparatus having a hand writing function using a multi-touch according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
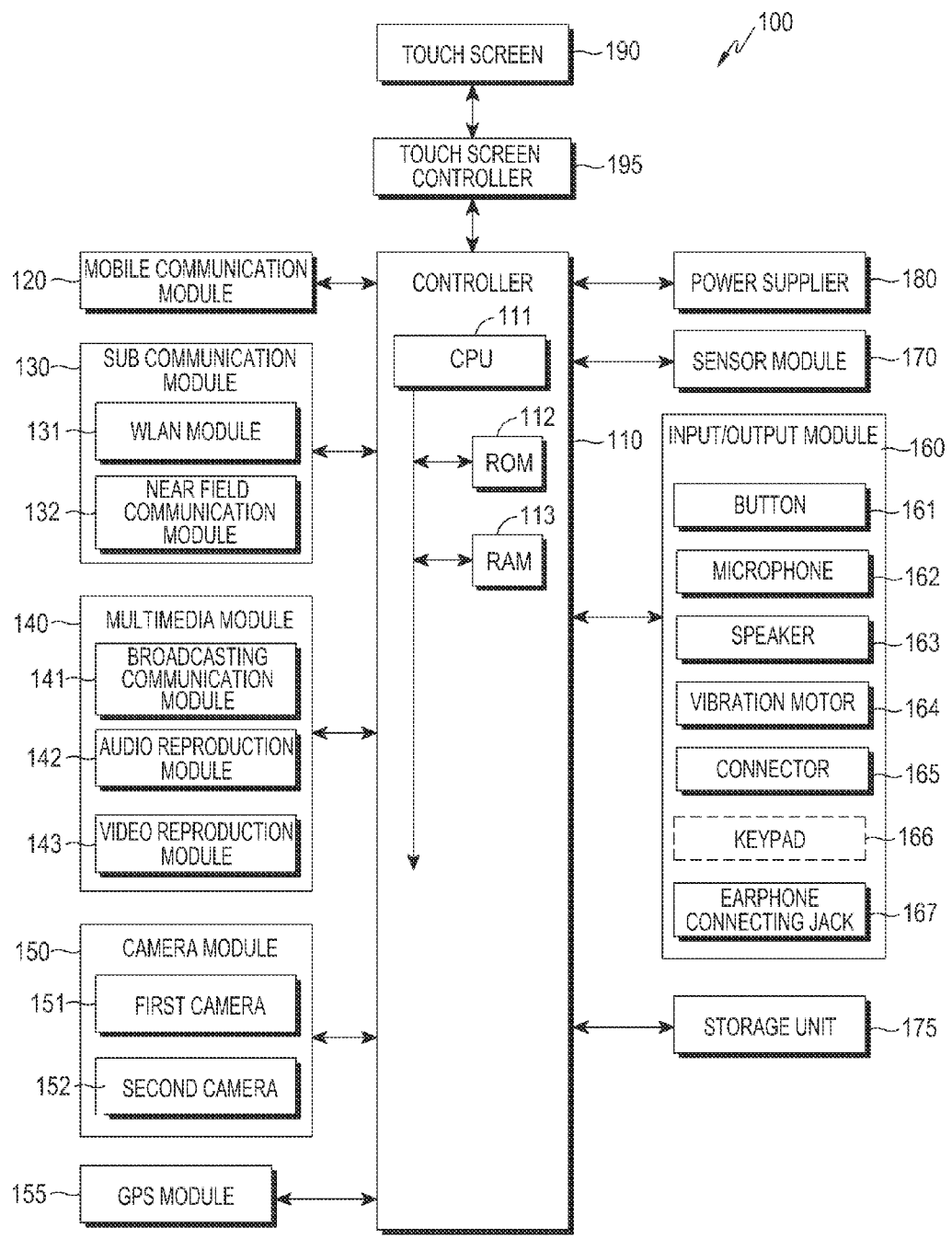
FIG. 1 is a block diagram schematically illustrating a mobile apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms including an ordinal number, such as "first" and "second", may be used for describing various constituent elements, but the constituent elements are not limited by the terms. The terms are used only for the purpose of discriminating one constituent element from another constituent element. For example, a first constituent element may be called a second constituent element, and similarly, a second constituent element may also be called a first constituent element, without departing from the scope of the present invention. A term "and/or" includes a combination of a plurality of described items or any one item among a plurality of described items.

Terminologies used herein are provided to merely mention specific exemplary embodiments and are not intended to limit the present invention. Singular expressions used herein include plurals unless they have definitely opposite meanings. It should be understood that the meaning of "comprising" or "having" used in this specification gives shape to existence of specific characteristics, numbers, steps, operations, constituent elements, and/or components, or a combination thereof, and do not exclude the existence or addition of other specific characteristics, numbers, steps, operations, constituent elements, components, or a combination thereof.

All of the terminologies containing one or more technical or scientific terminologies have the same meanings that persons skilled in the art would ordinarily affix to such terminologies unless such terminologies are defined otherwise. A term ordinarily used as the term is defined by a dictionary shall be construed such that the term has a meaning equal to the dictionary definition in the context of a related description, and shall not be construed in an ideal or excessively formal meaning unless such a meaning is clearly defined in the present specification.

FIG. 1 is a block diagram schematically illustrating a mobile apparatus according to an exemplary embodiment of the present invention.

Referring to FIG. 1, an apparatus 100 may be connected to an external device (not shown) by using an external device connection unit, such as, for example, a sub communication module 130, a connector 165, and an earphone connecting jack 167. The "external device" may include various devices, such as an earphone, an external speaker, a Universal Serial Bus (USB) memory, a charger, a cradle, a docking station, a DMB antenna, a mobile payment-related device, a health management device (e.g., a blood sugar measurement device, and the like), a game device, and a car navigation device, each of which are detachable and connectable (e.g., via a wire) to the apparatus 100. Further, the "external device" may include a Bluetooth communication device, a Near Field Communication (NFC) device, a WiFi direct communication device, and a wireless Access Point (AP), each of which are wirelessly connectable to the apparatus 100 through NFC. Further, the external device may include another device, a mobile phone, a smart phone, a tablet PC, a desktop PC, a server, and the like.

Referring to FIG. 1, the apparatus 100 includes a display unit 190 and a display controller 195. Further, the apparatus 100 includes a controller 110, a mobile communication module 120, a sub communication module 130, a multimedia module 140, a camera module 150, a Global Positioning System (GPS) module 155, an input/output module 160, a sensor module 170, a storage unit 175, and a power supplier 180. The sub communication module 130 includes at least one of a WLAN module 131 and an NFC module 132, and the multimedia module 140 includes at least one of a broadcasting communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, a connector 165, a keypad 166, and an earphone connecting jack 167. Hereinafter, a case in which the display unit 190 and the display controller 195 are a touch screen and a touch screen controller, respectively, will be described as an example.

The controller 110 may include a CPU 111, a ROM 112 in which a control program for control of the apparatus 100 is stored, and a RAM 113 for storing a signal or data input from an exterior of the apparatus 100 or used as a memory region for an operation performed in the apparatus 100. The CPU 111 may include a variable number of cores such as, for example, a single core, dual cores, triple-cores, or quad-cores. The CPU 111, the ROM 112, and the RAM 113 may be connected with each other through an internal bus.

The controller 110 may control the mobile communication module 120, the sub communication module 130, the multimedia module 140, the camera module 150, the GPS module 155, the input/output module 160, the sensor module 170, the storage unit 175, the power supplier 180, the touch screen 190, and the touch screen controller 195.

The mobile communication module 120 enables the apparatus 100 to connect to the external device through mobile communication by using one or more antennas (not shown) under the control of the controller 110. The mobile communication module 120 transceives a wireless signal for voice communication, video communication, Short Message Service (SMS), Multimedia Messaging Service (MMS), and the like with a mobile phone (not shown), a smart phone (not shown), a table Personal Computer (PC), or the like (not shown) including a telephone number input in the apparatus 100.

The sub communication module 130 may include at least one of the WLAN module 131 and the NFC module 132. For example, the sub communication module 130 may include only the WLAN module 131, only the NFC module 132, or both the WLAN module 131 and the NFC module 132.

The controller 110 may control the WLAN module 131 to connect to the Internet at a place in which a wireless AP (not shown) is installed. The WLAN module 131 supports the WLAN standard (IEEE802.11x) of the Institute of Electrical and Electronics Engineers (IEEE). The controller 110 may control the NFC module 132 to wirelessly establish NFC between the apparatus 100 and an image forming device (not shown). A method for NFC may include Bluetooth communication, Infrared Data Association (IrDA), WiFi-direct communication, and NFC.

The apparatus 100 may include at least one among the mobile communication module 120, the WLAN module 131, and the NFC module 132 according to performance thereof.

For example, the apparatus 100 may include a combination of the mobile communication module 120, the WLAN module 131, and the NFC module 132 according to performance thereof.

The multimedia module 140 may include the broadcasting communication module 141, the audio reproduction module 142, and/or the video reproduction module 143. The controller 110 may control the broadcasting communication module 141 to receive a broadcasting signal (e.g., a TV broadcasting signal, a radio broadcasting signal, a data broadcasting signal, or the like) and additional broadcasting information (e.g., Electric Program Guide (EPS) or Electric Service Guide (ESG)) transmitted from a broadcasting station through a broadcasting communication antenna (not shown). The controller 110 may control the audio reproduction module 142 to reproduce a stored or received digital audio file (e.g., a file having an extension of mp3, wma, ogg, way, or the like). The controller 110 may control the video reproduction module 143 to reproduce a stored or received digital video file (e.g., a file having an extension of mpeg, mpg, mp4, avi, mov, mkv, or the like). The video reproduction module 143 may reproduce a digital audio file.

The multimedia module 140 may include the audio reproduction module 142 and the video reproduction module 143, except for the broadcasting communication module 141. Further, the audio reproduction module 142 or the video reproduction module 143 of the multimedia module 140 may be included in the controller 110.

The camera module 150 may include at least one of the first camera 151 and the second camera 152 for photographing a still image or a video according to the control of the controller 110. Further, the first camera 151 or the second camera 152 may include an auxiliary light source (e.g., a flash (not shown)) for providing a quantity of light necessary for photographing. The first camera 151 may be disposed in a front surface of the apparatus 100 and the second camera 152 may be disposed in a rear surface of the apparatus 100. Alternatively, the first camera 151 and the second camera 152 may be adjacently disposed (e.g., an interval between the first camera 151 and the second camera 152 is larger than 1 cm and is smaller than 8 cm) to photograph a 3D still image or a 3D video.

The GPS module 155 may receive a radio wave from a plurality of GPS satellites in orbit around the Earth and calculate a position of the apparatus 100 by using a time of arrival from the GPS satellite (not shown) to the apparatus 100.

The input/output module 160 may include at least one of a plurality of buttons 161, the microphone 162, the speaker 163, the vibration motor 164, the connector 165, and the keypad 166.

The plurality of buttons 161 may be formed in a front surface, a side surface, or a rear surface of a housing of the apparatus 100, and may include at least one of a start/lock button (not shown), a volume button (not shown), a menu button, a home button, a back button, a search button, and the like.

The controller 110 may control the microphone 162 to receive voice or sound to generate an electrical signal.

The speaker 163 may output sound corresponding to various signals (e.g., a wireless signal, a broadcasting signal, a digital audio file, a digital video file, a photographing function, and the like) of the mobile communication module 120, the sub communication module 130, the multimedia module 140, or the camera module 150 to the outside of the apparatus 100 according to the control of the controller 110. The speaker 163 may output sound (e.g., a button manipulation sound, a telephone conversation connection sound corresponding to telephone conversation, and the like) corresponding to a function performed by the apparatus 100. One or more speakers 163 may be formed at an appropriate position or positions of the housing of the apparatus 100.

The controller 110 may control the vibration motor 164 to convert an electrical signal to mechanical vibration. For example, when the apparatus 100 in a vibration mode receives a voice telephone conversation from another device (not shown), the vibration motor 164 is operated. One or more vibration motors 164 may be formed inside the housing of the apparatus 100. The vibration motor 164 may be operated in response to a touch operation of a user touching the touch screen 190, a continuous movement of a touch on the touch screen 190, and the like.

The connector 165 may be used as an interface for connecting the apparatus 100 with an external apparatus (not shown) or a power source (not shown). The apparatus 100 may transmit or receive data stored in the storage unit 175 of the apparatus 100 to or from an external device (not shown) through a wired cable connected to the connector 165 according to the control of the controller 110. Further, the apparatus 100 may receive power from a power source (not shown) through a wired cable connected to the connector 165, or charge a battery (not shown) by using the power source.

The keypad 166 may receive key input from a user for controlling the apparatus 100. The keypad 166 may include at least one of a physical keypad (not shown) formed in the apparatus 100 and a virtual keypad (not shown) displayed on the touch screen 190. The physical keypad (not shown) formed in the apparatus 100 may be excluded according to a function or a structure thereof.

An earphone (not shown) may be inserted in the earphone connecting jack 167 to be connectable to the apparatus 100.

A stylus pen may be inserted inside the apparatus 100 to be stored, and may be pulled out and detachable from the apparatus 100 upon use.

The sensor module 170 includes one or more sensors for detecting a state of the apparatus 170. For example, the sensor module 170 may include a proximity sensor (not shown) for detecting proximity to the apparatus 100 of a user, an illumination sensor (not shown) for detecting a quantity of light around the apparatus 100, a motion sensor (not shown) for detecting a motion (e.g., a rotation of the apparatus 100, an acceleration or a vibration applied to the apparatus 100, and the like) of the apparatus 100, a geo-magnetic sensor (not shown) for detecting a point of the compass by using the Earth's magnetic field, a gravity sensor (not shown) for detecting an application direction of gravity, and an altimeter (not shown) for measuring air pressure to detect an altitude. The one or more sensors may detect a state of the apparatus 100 and generate a signal corresponding to the detection to transmit the generated signal to the controller 110. One of the one or more sensors of the sensor module 170 may be added or removed according to the performance of the apparatus 100.

The storage unit 175 may store a signal or data input/output in accordance with an operation of the mobile communication module 120, the sub communication module 130, the multimedia module 140, the camera module 150, the GPS module 155, the input/output module 160, the sensor module 170, and the touch screen 190. The storage unit 175 may store a control program and applications for controlling the apparatus 100 or the controller 110.

The term "storage unit" may include the storage unit 175, the ROM 112 within the controller 110, the RAM 113, a memory card (not shown) (e.g., an SD card and a memory stick), and/or the like mounted in the apparatus 100. The storage unit may include a non-nonvolatile memory, a volatile memory, a Hard Disk Drive (HDD), or a Solid State Drive (SSD).

The controller 110 may control the power supplier 180 to supply power to one or more batteries (not shown) disposed in the housing of the apparatus 100. The one or more batteries (not shown) supply power to the apparatus 100. Further, the power supplier 180 may supply power input from an external power source (not shown) to the apparatus 100 through a wired cable connected with the connector 165. Further, the power supplier 180 may also supply power wirelessly input from an external power source to the apparatus 100 through a wireless charging technology.

The touch screen 190 may supply user interfaces corresponding to various services (e.g. telephone conversation, data transmission, broadcasting, and photography) to a user. The touch screen 190 may transmit an analog signal corresponding to at least one touch input in the user interface to the touch screen controller 195. The touch screen 190 may receive at least one touch through a body part (e.g., a finger including a thumb) of a user or an input means (e.g., a stylus pen) capable of making a touch. Further, the touch screen 190 may receive a continuous movement of one touch among one or more touches. The touch screen 190 may transmit an analog signal corresponding to a continuous movement of an input touch to the touch screen controller 195.

According to exemplary embodiments of the present invention, a touch is not limited to a contact with a body part of a user or an input means capable of making a touch. For example, the touch may include a non-contact event. In this case, a detectable interval in the touch screen 190 may be changed according to performance or a structure of the apparatus 100. The touch screen 190 may be configured such that values (e.g., current values) detected by a touch event and a hovering event are differently output so as to distinguish the touch event according to a contact with a body part of a user or an input means capable of making a touch from an input event (e.g., a hovering) in a non-contact state and detect the touch event or the input event. Further, the touch screen 190 may preferably output different detected values (e.g., current values, and the like) according to a distance between a space in which a hovering event is generated and the touch screen 190.

The touch screen 190 may be implemented, for example, in a resistive type, a capacitive type, an infrared type, or an ultrasonic wave type.

The touch screen controller 195 converts the analog signal received from the touch screen 190 to a digital signal (e.g. x-y coordinates) and transmits the converted digital signal to the controller 110. The controller 110 may control the touch screen 190 by using the digital signal received from the touch screen controller 195. For example, the controller 110 may make an icon (not shown) displayed on the touch screen 190 be selected or execute an icon (not shown) in response to a touch event or a hovering event. Further, the touch screen controller 195 may be included in the controller 110. Further, the touch screen controller 195 may identify a distance between a space in which a hovering event is generated and the touch screen 190 by detecting a value (e.g., a current value, and the like) output through the touch screen 190, and may convert the identified distance value to a digital signal (e.g., a z-coordinate) and provide the converted digital signal to the controller 110.

Further, the touch screen 190 may include two or more touch screen panels capable of detecting each of a touch or a proximity of a body part of a user and an input means capable of making a touch so as to simultaneously receive an input by the body part of the user and the input means capable of making a touch. The two or more touch screen panels may provide different output values to the touch screen controller 195, and the touch screen controller 195 may differently recognize the values input from the two or more touch screen panels and distinguish whether the input in the touch screen is the input by the body part of the user or the input by the input means capable of making a touch. In this case, the touch screen panel receiving the input from the input means capable of making a touch may be, for example, an Electro-Magnetic Resonance (EMR) pad. The EMR pad may provide the output value to the touch screen controller 195 through transmission/reception of an electromagnetic radiation signal with, for example, a stylus pen.

Figure 2:
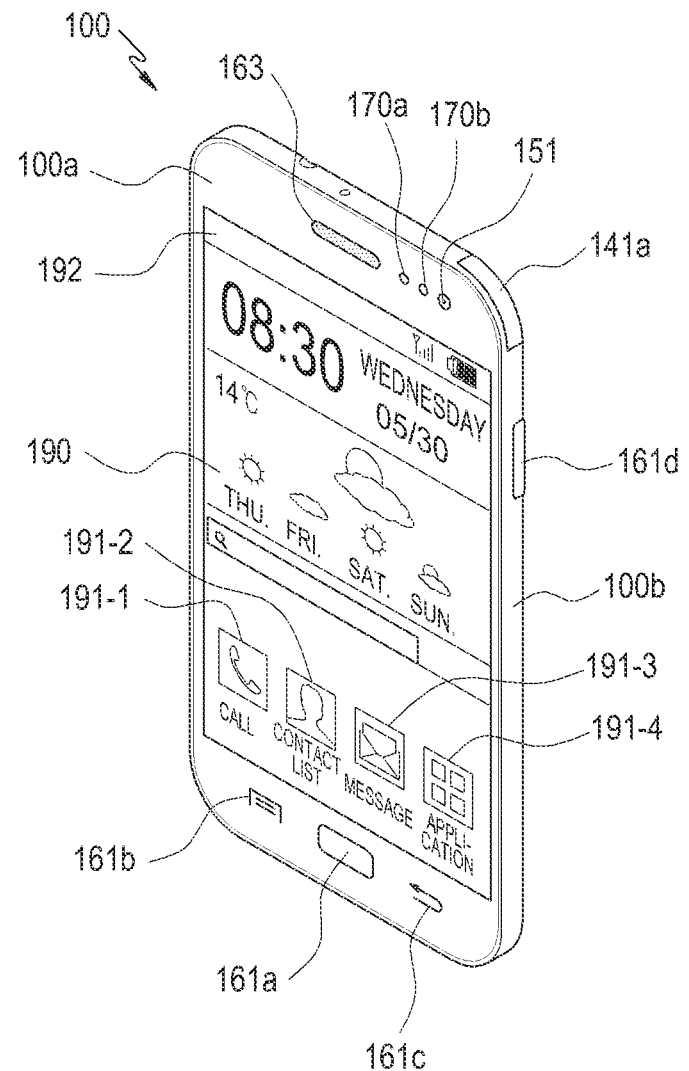
FIG. 2 is a front perspective view of a mobile apparatus according to an exemplary embodiment of the present invention.
Figure 3:
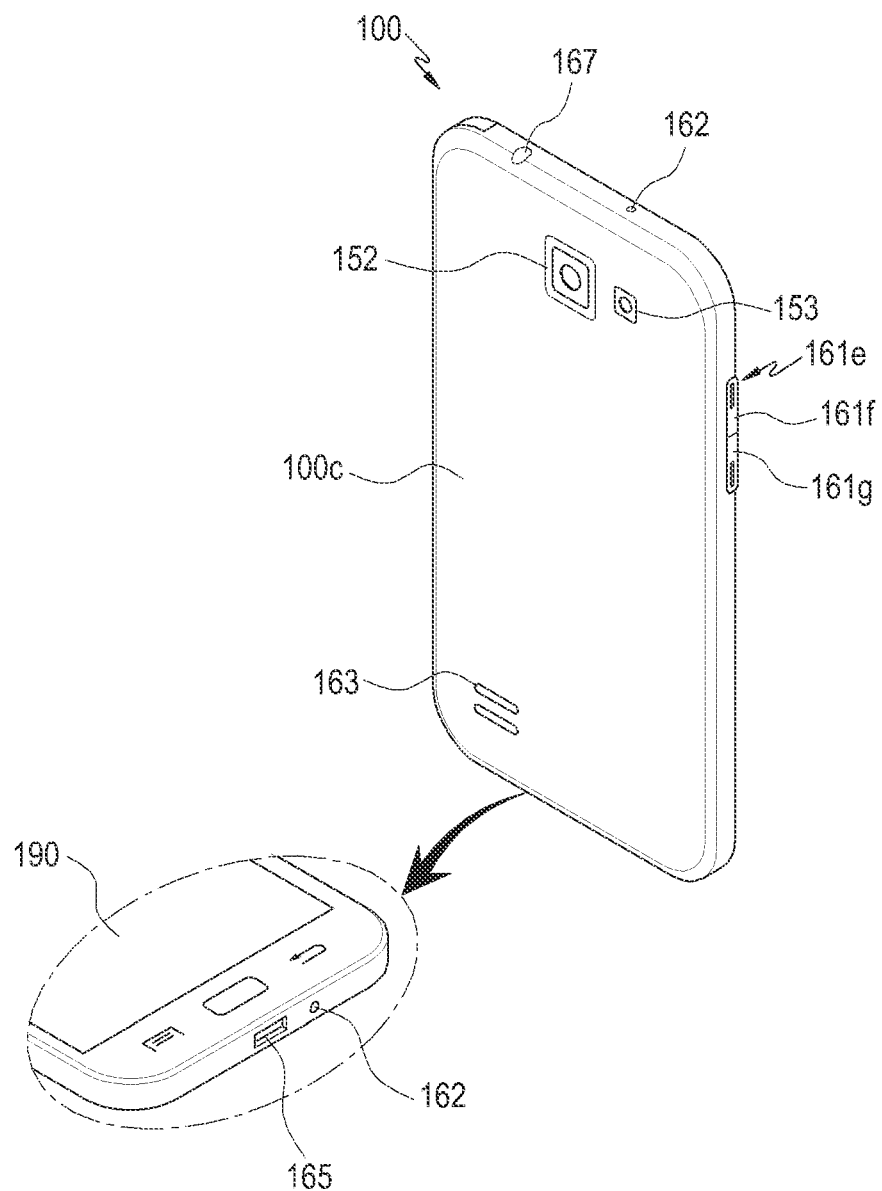
FIG. 3 is a rear perspective view of a mobile apparatus according to an exemplary embodiment of the present invention.

FIG. 2 is a front perspective view of a mobile apparatus according to an exemplary embodiment of the present invention. FIG. 3 is a rear perspective view of a mobile apparatus according to an exemplary embodiment of the present invention.

Referring to FIG. 2, the touch screen 190 is disposed at a center of a front surface 100a of the apparatus 100. The touch screen 190 is formed in a large size so as to occupy most of the front surface 100a of the apparatus 100. FIG. 2 illustrates an example in which a main home image is displayed on the touch screen 190. The main home image is an initial image displayed on the touch screen 190 when the power of the apparatus 100 is turned on. Further, when the apparatus 100 has different home images with several pages, the main home image may be the first home image among the home images with the several pages. Shortcut icons 191-1, 191-2, and 191-3 for executing frequently used applications and icons, an application image executing icon 191-4, time, weather, and the like may be displayed on the home image. The application image executing icon 191-4 displays application images on the touch screen 190. Further, a status bar 192 for displaying a state of the apparatus 100, such as a battery charged state, strength of a reception signal, and a current time, may be formed at an upper end of the touch screen 190.

A home button 161a, a menu button 161b, and a back button 161c may be formed at a lower portion of the touch screen 190.

The home button 161a causes the main home image to be displayed on the touch screen 190. For example, when the home button 161a is pressed (or touched) in a state in which the main home image and another home image or the menu image are displayed on the touch screen 190, the main home image may be displayed on the touch screen 190. Further, when the home button 161a is pressed (or touched) during the execution of applications on the touch screen 190, the main home image illustrated in FIG. 2 may be displayed on the touch screen 190. Further, the home button 161a may be used for displaying recently used application on the touch screen 190 or displaying a task manager.

The menu button 161b provides a connection menu usable on the touch screen 190. The connection menu may include a Widget addition menu, a background image change menu, a search menu, an edit menu, a setup menu, and the like. Further, a connection menu connected to an application may be provided upon the execution of the application.

The back button 161c may display an image which had been executed directly before a current executed image or finish the most currently used application.

The first camera 151, the illumination sensor 170a, and the proximity sensor 170b may be arranged at an edge of the front surface 100a of the apparatus 100. The second camera 152, a flash 153, and the speaker 163 may be arranged on the rear surface 100c of the apparatus 100.

For example, a power/reset button 161d, a volume control button 161e, a terrestrial DMB antenna 141a for receiving broadcasting, one or more microphones 162, and the like may be arranged in a side surface 100b of the apparatus. The volume control button 161e may control a first volume control button 161f (e.g., for increasing the volume) and a second volume control button 161g (e.g., for decreasing the volume). The DMB antenna 141a may be fixed to the apparatus 100 or detachably formed in the apparatus 100.

Further, the connector 165 is formed in a side surface of a lower end of the apparatus 100. A plurality of electrodes is formed in the connector 165 and may be wiredly connected with an external device. The earphone connecting jack 167 may be formed in a side surface of an upper end of the apparatus 100. An earphone may be inserted in the earphone connecting jack 167.

Figure 4:
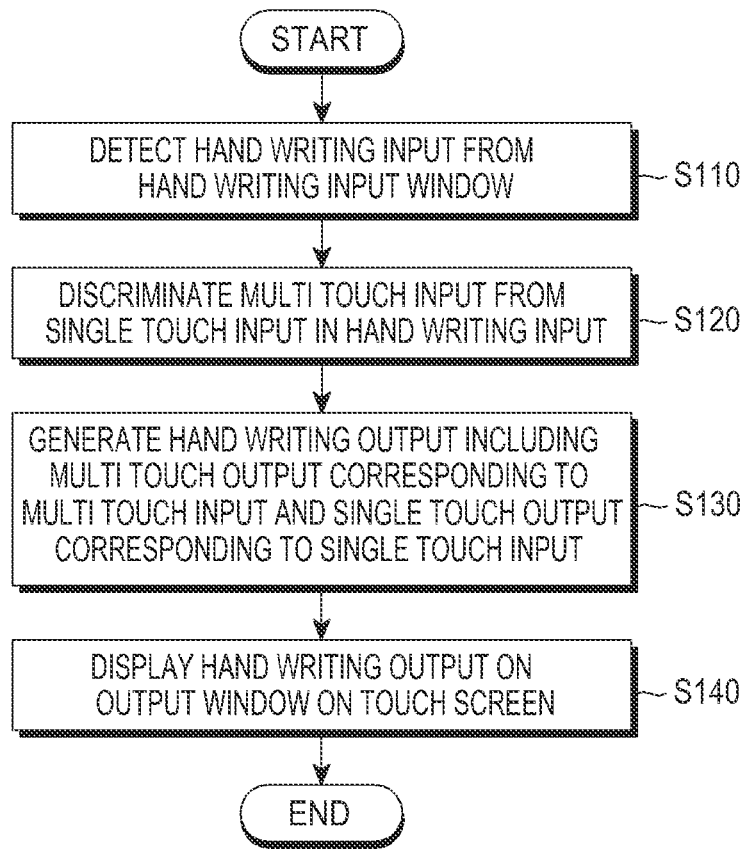
FIG. 4 is a flowchart illustrating a method of controlling a mobile apparatus having a hand writing function using a multi-touch according to an exemplary embodiment of the present invention.
Figure 5:
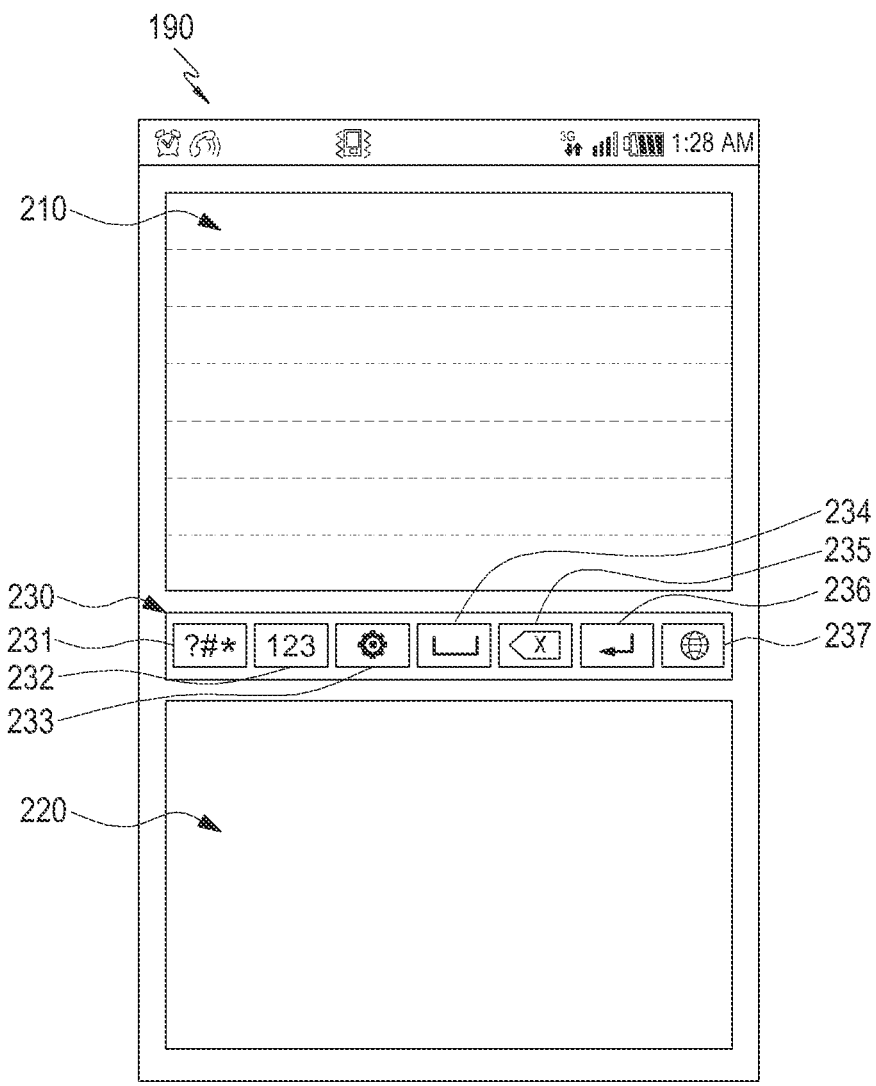
FIG. 5 is a diagram illustrating a screen of a mobile apparatus according to an exemplary embodiment of the present invention.

FIG. 4 is a flowchart illustrating a method of controlling a mobile apparatus having a hand writing function using a multi-touch according to an exemplary embodiment of the present invention. FIG. 5 is a diagram illustrating a screen of a mobile apparatus according to an exemplary embodiment of the present invention. FIGS. 6A and 6B are diagrams illustrating a comparative example of mobile apparatuses having a hand writing function. FIGS. 7A and 7B are diagrams illustrating a screen of a mobile apparatus according to an exemplary embodiment of the present invention.

Referring to FIG. 4, hand writing input is first detected from an input window on the touch screen of the mobile apparatus in step S110.

Referring to FIG. 5, an input window 220 may be displayed on the screen 190. The screen 190 may be formed as a touch screen. Accordingly, the input window 220 displayed on the screen 190 of the mobile device 100 formed as the touch screen may receive touch input from a user input means. In this case, the user input means may include a body part of a user (e.g., a finger including the thumb, and the like) or an input means capable of making a touch (e.g., a stylus pen, and the like). Accordingly, the controller 110 of the mobile apparatus may detect the hand writing input from the input window 220. For example, the controller 110 may detect the hand writing input handwritten on the input window 220 through the user input means. For example, when the user performs a touch of the hand writing on the input window 220 through the finger (which is one example of the user input means), the controller 110 may detect the hand writing input by detecting the touch. For another example, when the user performs a touch of the hand writing on the input window 220 through a stylus pen, the controller 110 may detect the hand writing input by detecting the touch.

An output window 210 may be displayed on the screen 190. The output window corresponds to a window for outputting and displaying the hand writing input that is input through the input window 220 of the screen 190.

A menu window 230 may be displayed on the screen 190. Menu items 231 to 237 respectively corresponding to functions related to the hand writing may be included in the menu window 230. For example, a symbol item 231 may be included in the menu items. When a touch to the symbol item 231 is detected by the controller 110, the controller 110 may receive input of a symbol through the input window 220. Further, a number item 231 may be included in the menu items. When a touch to the number item 232 is detected by the controller 110, the controller 110 may receive input of a number through the input window 220. Further, a setup item 233 may be included in the menu items. When a touch to the setup item 233 is detected by the controller 110, the controller 110 may display a detailed setup item for changing a function setup for the hand writing on the screen. Further, a space item 234 may be included in the menu items. When a touch to the space item 234 is detected by the controller 110, the controller 110 may output a blank on the output window 210. Further, a backspace item 235 may be included in the menu items. When a touch to the backspace item 235 is detected by the controller 110, the controller 110 may delete a preceding output corresponding to one data (e.g., a character) in the output window 210. Further, an enter item 236 may be included in the menu items. When a touch to the enter item 236 is detected by the controller 110, the controller 110 may display a cursor by changing a line of the cursor to a next below line.

Next, multi touch input and single touch input are distinguished in the hand writing input in step S120. Referring to FIGS. 7A and 7B, the screen of the mobile apparatus 100 may be formed as the touch screen 190. The output window 210 for outputting hand writing, the input window 220 for receiving hand writing, and the menu window 230 may be displayed on the touch screen 190 as illustrated in FIG. 5. Further, as described above, in step S110, the controller 110 of the mobile apparatus may detect hand writing input 300 by detecting a touch of a user input means.

Then, the controller 110 may determine (or distinguish) whether a hand writing input window on the touch screen is a multi touch input or a single touch input in the hand writing input 300 detected in step S120. The single touch input corresponds to one general simple touch, and the multi touch input corresponds to a plurality of simultaneously input touches (in this case, the multi touch input is distinguished from double touches performed by an operation of touches two times by a specific time interval).

Accordingly, when the plurality of simultaneously input touches is detected from the hand writing input 300 detected from the touch of the user input means, the controller 110 may distinguish the plurality of simultaneously input touches as the multi touch input, and when one general simple touch is detected from the hand writing input 300, the controller 110 may distinguish the one general simple touch as the single touch input. For example, referring to FIG. 7A, the controller 110 may receive "Case" as the hand writing input 300 by a finger touch of the user on the input window 220. In this case, the controller 110 may distinguish hand writing input generated by a multi touch gesture 302 by the user, for example, the gesture 302 of touching the input window 220 with two fingers as illustrated in FIG. 7A, as multi touch input 304. For example, in the example of FIG. 7A, the hand writing input by the gesture 302 of multi touching two "C"s by two fingers may be distinguished as the multi touch input 304 by the controller 110. Further, the controller 110 may distinguish hand writing input generated by a single touch gesture 312 by the user, for example, the gesture 312 of touching the input window 220 by one finger as illustrated in FIG. 7A, as the single touch input 314. For example, in the example of FIG. 7A, the hand writing input by the gesture 312 of single touching "ase" by one finger may be distinguished as the single touch input 314 by the controller 110.

Next, hand writing output including multi touch output corresponding to the multi touch input and single touch output corresponding to the single touch input is generated in step S130. The controller 110 may generate hand writing output including multi touch output corresponding to the multi touch input distinguished in step S120 and single touch output corresponding to the single touch input distinguished in step S120. For example, in FIG. 7A, multi touch input 304 for "c" is displayed on the input window 220. Further, in FIG. 7B, a hand writing output 400 is displayed in the output window 210. For example, multi touch output 404 corresponding to the multi touch input 304 is displayed on the output window 210. For example, the controller 110 may generate the multi touch output 404 corresponding to the multi touch input 304 generated by the multiple touches. In this case, the multi touch input 304 may include, for example, a first touch and a second touch. As illustrated in FIG. 7A, according to the multi touch gesture 302 of touching "c" on the input window 220 by the two fingers, the first touch and the second touch of touching "c" may be detected by the controller 110. Then, the controller 110 may generate the multi touch output 404 by recognizing writing by comparing the first touch or the second touch with pre-stored writing recognition data included in a writing recognition database. Further, the controller 110 may generate the single touch output 414 by recognizing writing by comparing the single touch input 314 with pre-stored writing recognition data included in a writing recognition database.

The multi touch input may be English, and the multi touch output may be a capital letter of the English alphabet. For example, when the multi touch input 304 is English as illustrated in FIG. 7A, the controller 110 may generate the multi touch output 404 corresponding to the multi touch input 304 as the capital letter of the English alphabet. For example, when the multi touch input 304 is detected as "c" as illustrated in FIG. 7A, the controller 110 may recognize the writing as "c" by comparing the multi touch input 304 that is "c" with the pre-stored writing recognition database. However, in this case, when "c" that is the recognized writing is detected as the multi touch input, the controller 110 may generate "c" that is the multi touch input as the multi touch output 404 with the capital letter of "C" as illustrated in FIG. 7B. An effect of the exemplary embodiment of the present invention will be described with reference to FIGS. 6A and 6B. Referring to FIGS. 6A and 6B, a hand writing input gesture 221 by a single touch on the input window 220 of the touch screen 190 is detected. When hand writing input 222 by the hand writing input gesture 221 of the single touch is detected, hand writing output 225 may be incorrectly output. For example, when the hand writing input 222 includes first input 223 that is "C" input as a capital letter and second input 224 that is "ase" input as small letters, "Case" should be actually output on the output window 210, but "case" 225 may be output instead as illustrated in FIG. 7B. The reason is that in a case of the letter "c", the capital letter and the small letter have the same shape, are of a different size, so that a case frequently occurs that the controller cannot distinguish and determine the capital letter and the small letter. For example, a case in which first output 226 corresponding to the first input 223 that is "C" input as the capital letter is output as the small letter is frequently generated. As illustrated, the second output 227 corresponds to the second input 224. For example, recognition of the hand writing of the user input through the input window is deteriorated.

However, according to the exemplary embodiment of the present invention, when the multi touch input is detected, the multi touch output corresponding to the multi touch input may be generated while being distinguished from the single touch input, so that the problem in the comparative example of FIGS. 6A and 6B is not generated.

For example, the controller 110 may distinguish the multi touch output corresponding to the multi touch input from the single touch output corresponding to the single touch input to generate the multi touch output and the single touch output. For example, when the multi touch input is English, the controller 110 may generate the multi touch output corresponding to the multi touch input as a capital letter of the English alphabet. Accordingly, when the user desires to input a capital letter of English, the user may easily input a desired capital letter of English by performing a multi touch on the input window. For example, the controller 110 may determine whether a hand writing input window on a touch screen of the mobile apparatus is a multi touch input or a single touch input. In addition, the controller 110 generates the multi touch output and the single touch output by discriminating (or determining) the multi touch output corresponding to the multi touch input from the single touch output corresponding to the single touch input, thereby improving recognition of the hand writing of the user input in the input window.

Next, the hand writing output is displayed on the output window on the touch screen in step S140. Referring to FIG. 7B, the controller 110 may display hand writing output 400 including the multi touch output 404 and the single touch output 414 generated in step S130 on the output window 210 on the touch screen 210. For example, the output window 210 corresponds to a window which is displayed on the screen 190 of the mobile apparatus to display the hand writing output 400. For example, because a note application is executed in the mobile apparatus 100 of FIG. 7B, the controller 110 may display the hand writing output 400 on the output window 210. The hand writing output 400 displayed on the output window 210 may be stored in the storage unit 175 of the mobile apparatus, for example, as data corresponding to a note.

FIGS. 8A and 8B are diagrams illustrating a first example of a method of controlling a mobile apparatus having a hand writing function using a multi touch according to an exemplary embodiment of the present invention.

Referring to FIG. 4 again, hand writing input is first detected from the input window on the touch screen of the mobile apparatus in step S110.

Referring to FIGS. 8A and 8B, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input through the input window 220 of the screen 190. The menu window 230 may be displayed on the screen 190. Menu items 231 to 237 having functions related to the hand writing may be included in the menu window 230.

Next, multi touch input and single touch input are distinguished in the hand writing input in step S120. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 8A and 8B, the controller 110 may distinguish "ㄱ" 320 and "ㅔ" 322 that is hand writing input 320 and 322 input in the input window 220 through the user input means as multi touch input.

For example, the controller 110 may distinguish hand writing input generated by a multi touch gesture by a user, for example, the gesture of touching the input window 220 in a shape of "ㄱ" with two fingers as illustrated in FIG. 8A, as multi touch input 320. Further, the controller 110 may also distinguish hand writing input generated by a gesture of touching the input window 220 in a shape of "ㅔ" with two fingers as multi touch input 322.

Next, hand writing output including multi touch output corresponding to the multi touch input and single touch output corresponding to the single touch input is generated in step S130. The controller 110 may generate hand writing output including multi touch output corresponding to the multi touch input distinguished in step S120 and single touch output corresponding to the single touch input distinguished in step S120.

For example, the controller 110 may generate the multi touch output 404 corresponding to the multi touch input 304 generated by the multiple touches. In this case, the controller 110 may generate the multi touch output 404 by recognizing writing by comparing the multi touch input with pre-stored writing recognition data included in a writing recognition database. Further, the controller 110 may generate the single touch output by recognizing the writing by comparing the single touch input with pre-stored writing recognition data included in a writing recognition database.

However, in this case, the multi touch input may be Korean, and the multi touch output may be a fortis of a Korean consonant or a diphthong of a Korean vowel. For example, when the multi touch input is Korean as illustrated in FIG. 8A, the controller 110 may generate the multi touch output corresponding to the multi touch input as a fortis of the Korean consonant or a diphthong of the Korean vowel.

For example, when the multi touch input 320 is detected as "ㄱ" as illustrated in FIG. 8A, the controller 110 may recognize the writing as "ㄱ" by comparing the multi touch input 304 that is "ㄱ" with the pre-stored writing recognition database. However, in this case, when "ㄱ" is detected as the multi touch input, the controller 110 may generate "ㄱ" that is the recognized writing as multi touch output 324 with "ㄲ" that is the fortis of the Korean consonant as illustrated in FIG. 8B. Further, when "ㅔ" is detected as the multi touch input 322 as illustrated in FIG. 8A, the controller 110 may recognize the writing as "ㅔ" by comparing the multi touch input 322 that is "ㅔ" with the pre-stored writing recognition database. However, in this case, when "ㅔ" that is the recognized writing is detected as the multi touch input, the controller 110 may generate "ㅔ" as multi touch output 326 with "ㅖ" that is the diphthong of the Korean vowel as illustrated in FIG. 8B. In this case, the fortis of the Korean consonant may be one of, for example, ㄲ, ㄸ, ㅉ, ㅃ, and ㅆ, and the diphthong of the Korean vowel may be one of, for example, ㅒ and ㅖ.

For example, when the multi touch input is Korean, the controller 110 may generate the multi touch output corresponding to the multi touch input as a fortis of a Korean consonant or a diphthong of a Korean vowel. Accordingly, when the user desires to input a fortis of a Korean consonant or a diphthong of a Korean vowel, the user may easily input a desired fortis of a Korean consonant or diphthong of a Korean vowel by performing a multi touch on the input window. For example, the controller 110 generates the multi touch output corresponding to the multi touch input that is Korean as a fortis of a Korean consonant or a diphthong of a Korean vowel, thereby improving recognition of the hand writing of the user input in the input window.

Next, the hand writing output is displayed on the output window on the touch screen in step S140. Referring to FIG. 8B, the controller 110 may display hand writing output including the multi touch output and the single touch output generated in step S130 on the output window 210 on the touch screen 210. For example, the output window 210 corresponds to a window which is displayed on the screen 190 of the mobile apparatus to display the hand writing output 400. For example, because a note application is executed in the mobile apparatus 100 of FIG. 8B, the controller 110 may display the hand writing output 324 and 326 on the output window 210. Further, the hand writing output 324 and 326 displayed on the output window 210 may be stored in the storage unit 175 of the mobile apparatus, for example, as data corresponding to a note.

FIGS. 9A and 9B are diagrams illustrating a second example of a method of controlling a mobile apparatus having a hand writing function using a multi-touch according to an exemplary embodiment of the present invention.

Referring to FIG. 4 again, hand writing input is first detected from the input window on the touch screen of the mobile apparatus in step S110.

Referring to FIGS. 9A and 9B, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items 231 to 237 having functions related to the hand writing may be included in the menu window 230.

Next, multi touch input and single touch input are distinguished in the hand writing input in step S120. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 9A and 9B, the controller 110 may distinguish "国" 330 that is hand writing input 330 input in the input window 220 through the user input means as multi touch input.

For example, the controller 110 may distinguish the hand writing input generated by a multi touch gesture by a user, for example, the gesture of touching the input window 220 in a shape of "国" with two fingers as illustrated in FIG. 9A, as multi touch input 330.

Next, hand writing output including multi touch output corresponding to the multi touch input and single touch output corresponding to the single touch input is generated in step S130. The controller 110 may generate hand writing output including multi touch output corresponding to the multi touch input distinguished in step S120 and single touch output corresponding to the single touch input distinguished in step S120.

For example, the controller 110 may generate the multi touch output 332 corresponding to the multi touch input 330 generated by the multiple touches. In this case, the controller 110 may generate the multi touch output 332 by recognizing writing by comparing the multi touch input with pre-stored writing recognition data included in a writing recognition database. Further, the controller 110 may generate the single touch output by recognizing the writing by comparing the single touch input with pre-stored writing recognition data included in a writing recognition database.

However, in this case, the multi touch input may be a simplified character of Chinese, and the multi touch output may be a traditional character of Chinese. For example, when the multi touch input is a simplified character of Chinese as illustrated in FIG. 9A, the controller 110 may generate the multi touch output corresponding to the multi touch input as a traditional character of Chinese. For example, when the multi touch input 330 is detected as "国" illustrated in FIG. 9A, the controller 110 may recognize the writing as "国" by comparing the multi touch input 330 that is "国" with the pre-stored writing recognition database. However, in this case, when the simplified character of Chinese "国" that is the recognized writing is detected as the multi touch input, the controller 110 may generate "国" that is the simplified character of Chinese as multi touch output 332 with "國" that is the traditional character of Chinese as illustrated in FIG. 9B.

For example, when the multi touch input is a simplified character of Chinese, the controller 110 may generate the multi touch output corresponding to the multi touch input as a traditional character of Chinese. Accordingly, when the user desires to input a traditional character of Chinese, the user may easily input a desired traditional character of Chinese by performing a multi touch on the input window. For example, the controller 110 generates the multi touch output corresponding to the multi touch input that is a simplified character of Chinese as a traditional character of Chinese, thereby improving recognition of the hand writing of the user input in the input window.

Next, the hand writing output is displayed on the output window on the touch screen in step S140. Referring to FIG. 9B, the controller 110 may display hand writing output including the multi touch output and the single touch output generated in step S130 on the output window 210 on the touch screen 210. For example, the output window 210 corresponds to a window which is displayed on the screen 190 of the mobile apparatus to display the hand writing output 332. For example, because a note application is executed in the mobile apparatus 100 of FIG. 9B, the controller 110 may display the hand writing output 332 on the output window 210. Further, the hand writing output 332 displayed on the output window 210 may be stored in the storage unit 175 of the mobile apparatus, for example, as data corresponding to a note.

Figures 10A, 10B:
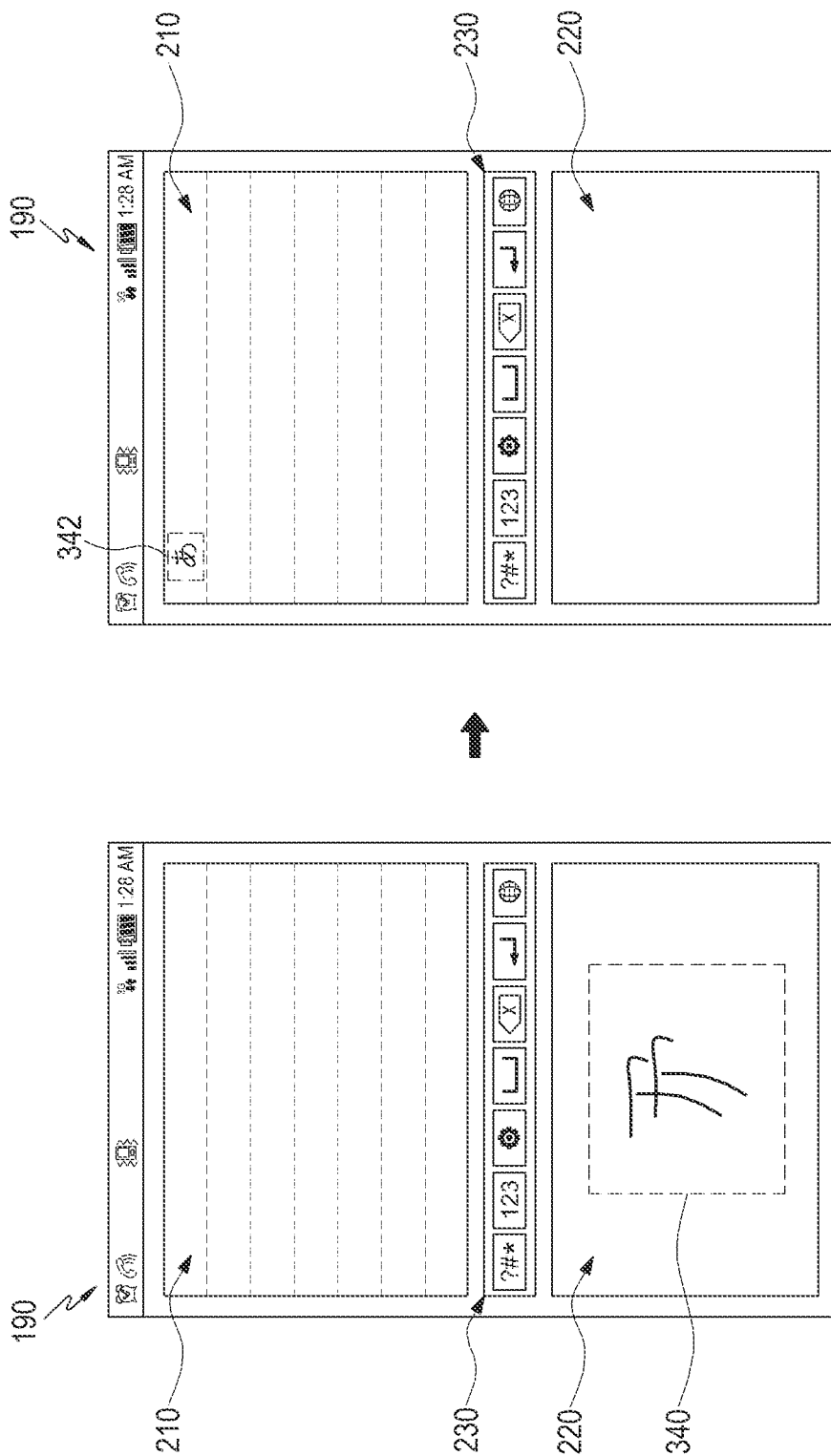
FIGS. 10A and 10B are diagrams illustrating a third example of a method of controlling a mobile apparatus having a hand writing function using a multi-touch according to an exemplary embodiment of the present invention.

FIGS. 10A and 10B are diagrams illustrating a third example of a method of controlling a mobile apparatus having a hand writing function using a multi-touch according to an exemplary embodiment of the present invention.

Referring to FIG. 4 again, hand writing input is first detected from the input window on the touch screen of the mobile apparatus in step S110.

Referring to FIGS. 10A and 10B, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items having functions related to the hand writing may be included in the menu window 230.

Next, multi touch input and single touch input are distinguished in the hand writing input in step S120. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 10A and 10B, the controller 110 may distinguish "ア" that is hand writing input 340 input in the input window 220 through the user input means as multi touch input.

For example, the controller 110 may distinguish the hand writing input generated by a multi touch gesture by a user, for example, the gesture of touching the input window 220 in a shape of "ア" with two fingers as illustrated in FIG. 10A, as multi touch input 340.

Next, hand writing output including multi touch output corresponding to the multi touch input and single touch output corresponding to the single touch input is generated in step S130. The controller 110 may generate hand writing output including multi touch output corresponding to the multi touch input distinguished in step S120 and single touch output corresponding to the single touch input distinguished in step S120.

For example, the controller 110 may generate the multi touch output 342 corresponding to the multi touch input 340 generated by the multiple touches. In this case, the controller 110 may generate the multi touch output 342 by recognizing writing by comparing the multi touch input with pre-stored writing recognition data included in a writing recognition database. Further, the controller 110 may generate the single touch output by recognizing the writing by comparing the single touch input with pre-stored writing recognition data included in a writing recognition database.

However, in this case, the multi touch input may be a Katakana character of Japanese, and the multi touch output may be a Hiragana character of Japanese. For example, when the multi touch input is a Katakana character of Japanese as illustrated in FIG. 10A, the controller 110 may generate the multi touch output corresponding to the multi touch input as a Hiragana character of Japanese. For example, when the multi touch input 340 is detected as "ア" as illustrated in FIG. 10A, the controller 110 may recognize the writing as "ア" by comparing the multi touch input 340 that is "ア" with the pre-stored writing recognition database. However, in this case, when "ア" that is the recognized writing is detected as the multi touch input, the controller 110 may generate "ア" that is the a Hiragana character of Japanese as multi touch output 342 with "あ" corresponding to the Hiragana character of Japanese as illustrated in FIG. 10B.

For example, when the multi touch input is a Katakana character of Japanese, the controller 110 may generate the multi touch output corresponding to the multi touch input as a Hiragana character of Japanese. Accordingly, when the user desires to input a Hiragana character of Japanese, the user may easily input a desired Hiragana character of Japanese by performing a multi touch on the input window. For example, the controller 110 generates the multi touch output corresponding to the multi touch input that is a Katakana character of Japanese as a Hiragana character of Japanese, thereby improving recognition of the hand writing of the user input in the input window.

In contrast, the multi touch input may be a Hiragana character of Japanese, and the multi touch output may be a Katakana character of Japanese. For example, when the multi touch input is a Hiragana character of Japanese as illustrated in FIG. 10A, the controller 110 may generate the multi touch output corresponding to the multi touch input as a Katakana character of Japanese. For example, when the multi touch input 340 is detected as "あ" that is a Hiragana character of Japanese, the controller 110 may recognize the writing as "あ" by comparing the multi touch input 340 that is "あ" with the pre-stored writing recognition database. However, in this case, when "あ" that is the recognized writing is detected as the multi touch input, the controller 110 may generate "あ" as multi touch output 342 with the Katakana character of Japanese.

For example, when the multi touch input is a Hiragana character of Japanese, the controller 110 may generate the multi touch output corresponding to the multi touch input as a Katakana character of Japanese. Accordingly, when the user desires to input a Katakana character of Japanese, the user may easily input a desired Katakana character of Japanese by performing a multi touch on the input window. For example, the controller 110 generates the multi touch output corresponding to the multi touch input that is a Hiragana character of Japanese as a Katakana character of Japanese, thereby improving recognition of the hand writing of the user input in the input window.

Next, the hand writing output is displayed on the output window on the touch screen in step S140. Referring to FIG. 10B, the controller 110 may display hand writing output 342 including the multi touch output and the single touch output generated in step S130 on the output window 210 on the touch screen 210. For example, the output window 210 corresponds to a window which is displayed on the screen 190 of the mobile apparatus to display the hand writing output 342. For example, because a note application is executed in the mobile apparatus 100 of FIG. 10B, the controller 110 may display the hand writing output 342 on the output window 210. Further, the hand writing output 342 displayed on the output window 210 may be stored in the storage unit 175 of the mobile apparatus, for example, as data corresponding to a note.

FIGS. 11A and 11B are diagrams illustrating a fourth example of a method of controlling a mobile apparatus having a hand writing function using a multi-touch according to an exemplary embodiment of the present invention.

Referring to FIG. 4 again, hand writing input is first detected from the input window on the touch screen of the mobile apparatus in step S110.

Referring to FIGS. 11A and 11B, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items 231 to 237 having functions related to the hand writing may be included in the menu window 230.

Next, multi touch input and single touch input are distinguished in the hand writing input in step S120. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input.

Referring to FIGS. 11A and 11B, the controller 110 may distinguish "123" that is hand writing input 370 input in the input window 220 through the user input means as multi touch input, and distinguish "4" 372 as the single touch input.

For example, the controller 110 may distinguish the hand writing input generated by a multi touch gesture by a user, for example, the gesture of touching the input window 220 in a shape of "123" with two fingers as illustrated in FIG. 11A, as multi touch input 371. Further, the controller 110 may distinguish the hand writing input generated by a gesture of touching the input window 220 in a shape of "4" with one finger as single touch input 372.

Next, hand writing output including multi touch output corresponding to the multi touch input and single touch output corresponding to the single touch input is generated in step S130. The controller 110 may generate hand writing output including multi touch output corresponding to the multi touch input distinguished in step S120 and single touch output corresponding to the single touch input distinguished in step S120.

For example, the controller 110 may generate the hand writing output 373 corresponding to the multi touch input 371 generated by the multiple touches. In this case, the controller 110 may generate the multi touch output 373 by recognizing writing by comparing the multi touch input with pre-stored writing recognition data included in a writing recognition database. Further, the controller 110 may generate the single touch output 376 by recognizing the writing by comparing the single touch input 372 with pre-stored writing recognition data included in a writing recognition database.

However, in this case, the multi touch input may be one character, and the multi touch output may be a plurality of characters. Further, the character may be one of, for example, a number, a symbol, and a character. For example, when the multi touch input is a character (e.g., a number, as illustrated in FIG. 11A), the controller 110 may generate the multi touch output corresponding to the multi touch input as a plurality of characters (i.e., the plurality of numbers). For example, when the multi touch input 371 is detected as "1" as illustrated in FIG. 11A, the controller 110 may recognize the writing as "1" by comparing the multi touch input 371 that is "1" with the pre-stored writing recognition database. However, in this case, when "1" that is the recognized writing is detected as the multi touch input, the controller 110 may generate "1" as multi touch output 374 with a plurality of numbers, for example, "11" that is two numbers, as illustrated in FIG. 11B. Further, the controller 110 may generate the multi touch input 371 for "2" and "3" as multi touch output 374 with "22" and "33" similarly to "1" as illustrated in FIG. 11B.

Further, when the single touch input 372 is detected as "4" as illustrated in FIG. 11A, the controller 110 may recognize the writing as "4" by comparing the single touch input 372 that is "4" with the pre-stored writing recognition database to generate single touch output 376.

For example, when the multi touch input is one character, the controller 110 may generate the multi touch output corresponding to the multi touch input as a plurality of characters. Accordingly, when the user desires to input a plurality of characters, the user may easily input a plurality of characters by performing a multi touch on the input window. For example, the controller 110 generates the multi touch output corresponding to the multi touch input that is one character as a plurality of characters, thereby improving recognition of the hand writing of the user input in the input window.

Next, the hand writing output is displayed on the output window on the touch screen in step S140. Referring to FIG. 11B, the controller 110 may display hand writing output 373 including the multi touch output 374 and the single touch output 376 generated in step S130 on the output window 210 on the touch screen 210. For example, the output window 210 corresponds to a window which is displayed on the screen 190 of the mobile apparatus to display the hand writing output 373. For example, because a note application is executed in the mobile apparatus 100 of FIG. 11B, the controller 110 may display the hand writing output 373 on the output window 210. Further, the hand writing output 373 displayed on the output window 210 may be stored in the storage unit 175 of the mobile apparatus, for example, as data corresponding to a note.

FIGS. 12A and 12B are diagrams illustrating a fifth example of a method of controlling a mobile apparatus having a hand writing function using a multi-touch according to an exemplary embodiment of the present invention.

Referring to FIG. 4 again, hand writing input is first detected from the input window on the touch screen of the mobile apparatus in step S110.

Referring to FIGS. 12A and 12B, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items 231 to 237 having functions related to the hand writing may be included in the menu window 230.

Next, multi touch input and single touch input are distinguished in the hand writing input in step S120. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 12A and 12B, the controller 110 may distinguish hand writing input 378 for "ΔΔ" 379 input in the input window 220 through the user input means as multi touch input, and distinguish hand writing input 378 of "Δ" 380 as the single touch input.

For example, the controller 110 may distinguish the hand writing input generated by a multi touch gesture by a user, for example, the gesture of touching the input window 220 in a shape of "ΔΔ" with two fingers as illustrated in FIG. 12A, as multi touch input 379. Further, the controller 110 may distinguish the hand writing input generated by a gesture of touching the input window 220 in a shape of "Δ" with one finger as single touch input 380.

Next, hand writing output including multi touch output corresponding to the multi touch input and single touch output corresponding to the single touch input is generated in step S130. The controller 110 may generate hand writing output 382 including multi touch output corresponding to the multi touch input distinguished in step S120 and single touch output corresponding to the single touch input distinguished in step S120. The hand writing output 382 may be displayed in the output window 210.

For example, the controller 110 may generate the multi touch output 383 corresponding to the multi touch input 379 generated by the multiple touches. In this case, the controller 110 may generate the multi touch output 383 by recognizing writing by comparing the multi touch input with pre-stored writing recognition data included in a writing recognition database. Further, the controller 110 may generate the single touch output 384 by recognizing the writing by comparing the single touch input 380 with pre-stored writing recognition data included in a writing recognition database.

However, in this case, the multi touch input may be a first symbol, and the multi touch output may be a second symbol. Further, the second symbol may be a symbol having a similar shape to that of the first symbol. Further, when the first symbol is a symbol having no fill, the second symbol may be a symbol in which a fill is added to the first symbol. For example, when the multi touch input is a first symbol as illustrated in FIG. 12A, multi touch output corresponding to the multi touch input may be generated as a second symbol, and in this case, when the first symbol is a symbol having no fill, the second symbol may be a symbol in which a fill is added to the first symbol. For example, when the multi touch input 371 is detected as "$\Delta\Delta$" as illustrated in FIG. 12A, the controller 110 may recognize the writing as "$\Delta$" by comparing the multi touch input 371 that is "$\Delta\Delta$" with the pre-stored writing recognition database. However, in this case, when "$\Delta$" that is the recognized writing is detected as the multi touch input that is the symbol having no fill, the controller 110 may generate "$\Delta$" as multi touch output 383 with "$\blacktriangle$" that is the symbol to which the fill is added, as illustrated in FIG. 12B.

Further, when the single touch input 380 is detected as "$\Delta$" as illustrated in FIG. 12A, the controller 110 may recognize the writing as "$\Delta$" by comparing the single touch input 380 that is "$\Delta$" with the pre-stored writing recognition database to generate single touch output 384.

For example, when the multi touch input is a first symbol, the controller 110 may generate the multi touch output corresponding to the multi touch input as a second symbol. In this case, the second symbol may be a symbol having a similar shape to that of the first symbol. Further, when the first symbol is a symbol having no fill, the second symbol may be a symbol in which a fill is added to the first symbol. Accordingly, when the user desires to input a symbol, the user may easily input a symbol similar to the input symbol by performing a multi touch on the input window. For example, the controller 110 generates the multi touch output corresponding to the multi touch input that is the first symbol as the second symbol, thereby improving recognition of the hand writing of the user input in the input window.

Next, the hand writing output is displayed on the output window on the touch screen in step S140. Referring to FIG. 12B, the controller 110 may display hand writing output 382 including the multi touch output 383 and the single touch output 384 generated in step S130 on the output window 210 on the touch screen 210. For example, the output window 210 corresponds to a window which is displayed on the screen 190 of the mobile apparatus to display the hand writing output 382. For example, because a note application is executed in the mobile apparatus 100 of FIG. 12B, the controller 110 may display the hand writing output 382 on the output window 210. Further, the hand writing output 382 displayed on the output window 210 may be stored in the storage unit 175 of the mobile apparatus, for example, as data corresponding to a note.

FIGS. 13A and 13B are diagrams illustrating a seventh example of a method of controlling a mobile apparatus having a hand writing function using a multi-touch according to an exemplary embodiment of the present invention.

Referring to FIG. 4 again, hand writing input is first detected from the input window on the touch screen of the mobile apparatus in step S110.

Referring to FIGS. 13A and 13D, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items 231 to 237 having functions related to the hand writing may be included in the menu window 230.

Further, when a note application is executed in the mobile apparatus 100 as illustrated in FIGS. 13A and 13D, a Save icon 238 and a Cancel icon 239 may be displayed on the screen 190. In this case, when a touch of the Save icon 238 is detected by the controller 110, the controller 110 may store data displayed on the output window 210 in the storage unit 175. Further, when a touch of the Cancel icon 239 is detected by the controller 110, the controller 110 may cancel input on the note.

Next, multi touch input and single touch input are distinguished in the hand writing input in step S120. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIG. 13A, the controller 110 may distinguish "case" that is hand writing input 390 input in the input window 220 through the user input means as the single touch input. Further, referring to FIG. 13C, the controller 110 may distinguish "S" that is hand writing input 394 as the multi touch input.

For example, the controller 110 may distinguish the hand writing input generated by a gesture of touching the input window 220 in a shape of "case" with one finger as single touch input 390. Further, the controller 110 may distinguish the hand writing input generated by a multi touch gesture by a user, for example, the gesture of touching the input window 220 in a shape of "S" with two fingers as illustrated in FIG. 13C, as multi touch input 384.

Next, hand writing output including multi touch output corresponding to the multi touch input and single touch output corresponding to the single touch input is generated in step S130. The controller 110 may generate hand writing output including multi touch output corresponding to the multi touch input distinguished in step S120 and single touch output corresponding to the single touch input distinguished in step S120.

For example, the controller 110 may generate the multi touch output corresponding to the multi touch input 394 generated by the multiple touches. In this case, the controller 110 may generate the multi touch output by recognizing writing by comparing the multi touch input 394 with pre-stored writing recognition data included in a writing recognition database. Further, the controller 110 may generate the single touch output 392 by recognizing the writing by comparing the single touch input 390 with pre-stored writing recognition data included in a writing recognition database. Accordingly, when "case" is detected as the single touch input 390 as illustrated in FIG. 13a, the controller 110 may generate the single touch output 392 by recognizing the writing as "case" by comparing the single touch input 390 that is "case" with the pre-stored writing recognition data included in the writing recognition database.

However, in this case, the multi touch input may be a command, and the multi touch output may be execution of the command. For example, the controller 110 may control such that multi touch output corresponding to the multi touch input becomes the execution of the command of the multi touch input. For example, when the multi touch input 394 is detected as "S" as illustrated in FIG. 13C, the controller 110 may recognize the writing as "S" by comparing the multi touch input 394 that is "S" with the pre-stored writing recognition database. In this case, the controller 110 may execute a pre-stored command "Save" in response to determining that "S" is the recognized writing. For example, the controller 110 may execute "Save" 238 that is the pre-stored command corresponding to "S" that is the recognized writing in FIG. 13C and store data "case" output on the output window 210 in the storage unit of the mobile apparatus as illustrated in FIG. 13D. Then, the controller 110 may display a pop-up window 396 notifying that the data "case" is stored in the storage unit 175 on the screen 190.

For example, the controller 110 may control so that multi touch output is the execution of the command of the multi touch input. Accordingly, when the user desires to input a command, the user may easily execute the command by performing a multi touch of a pre-stored command. Accordingly, according to an exemplary embodiment of the present invention, there is an advantage in that a command may be input by a multi-touch using hand writing without separately touching a command icon.

Figure 14:
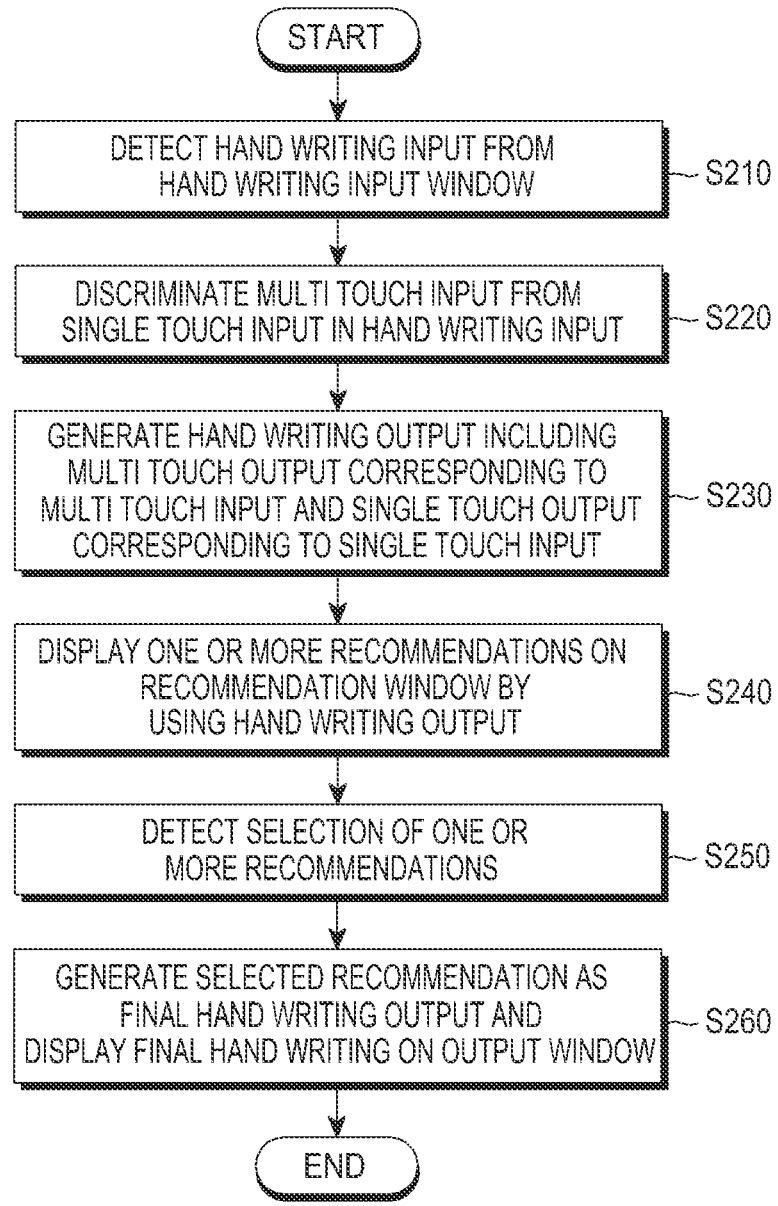
FIG. 14 is a flowchart illustrating a method of controlling a mobile apparatus having a hand writing function using a multi-touch according to an exemplary embodiment of the present invention.

FIG. 14 is a flowchart illustrating a method of controlling a mobile apparatus having a hand writing function using a multi-touch according to an exemplary embodiment of the present invention. FIGS. 15A to 15C are diagrams illustrating a screen of a mobile apparatus according to an exemplary embodiment of the present invention.

Referring to FIG. 14, hand writing input is first detected from a hand writing input window on a touch screen of the mobile apparatus in step S210.

Referring to FIGS. 15A and 15C, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items having functions related to the hand writing may be included in the menu window 230.

Next, multi touch input and single touch input are distinguished in the hand writing input in step S220. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 15A and 15C, the controller 110 may distinguish "c" 304 included in the hand writing input 300 input in the input window 220 through the user input means as multi touch input. Further, the controller 110 may distinguish "ase" 314 included in the hand writing input 300 input in the input window 220 through the user input means as the single touch input.

For example, the controller 110 may distinguish the hand writing input generated by a multi touch gesture by a user, for example, the gesture of touching the input window 220 in a shape of "c" with two fingers as illustrated in FIG. 15A, as multi touch input 304. Further, the controller 110 may distinguish the hand writing input generated by a gesture of touching the input window 220 in a shape of "ase" with one finger as single touch input 314.

Next, hand writing output including multi touch output corresponding to the multi touch input and single touch output corresponding to the single touch input is generated in step S230. The controller 110 may generate hand writing output including multi touch output corresponding to the multi touch input distinguished in step S220 and single touch output corresponding to the single touch input distinguished in step S220.

For example, the controller 110 may generate the multi touch output 242 corresponding to the multi touch input 304 generated by the multiple touches. In this case, the controller 110 may generate the multi touch output 242 by recognizing writing by comparing the multi touch input with pre-stored writing recognition data included in a writing recognition database. Further, the controller 110 may generate the single touch output by recognizing the writing by comparing the single touch input with pre-stored writing recognition data included in a writing recognition database.

However, in this case, the multi touch input may be English, and the multi touch output may be a capital letter of the English alphabet. For example, when the multi touch input is English as illustrated in FIG. 15A, the controller 110 may generate the multi touch output corresponding to the multi touch input as the capital letter of the English alphabet. For example, when the multi touch input 320 is detected as "c" as illustrated in FIG. 15A, the controller 110 may recognize the writing as "c" by comparing the multi touch input 304 that is "c" with the pre-stored writing recognition database. However, in this case, when "c" that is the recognized writing is detected as the multi touch input, the controller 110 may generate "c" as the multi touch output 242 with the English capital letter of "C" as illustrated in FIG. 15B. Further, when "ase" is detected as the single touch input 314, the controller 110 may generate the multi touch output by recognizing the writing as "ase" by comparing the single touch input 314 that is "ase" with the pre-stored writing recognition database.

For example, when the multi touch input is English, the controller 110 may generate the multi touch output corresponding to the multi touch input as a capital letter of the English alphabet. Accordingly, when the user desires to input a capital letter of English, the user may easily input a desired capital letter of English by performing a multi touch on the input window. For example, the controller 110 generates the multi touch output corresponding to the multi touch input as a capital letter of the English alphabet, thereby improving recognition of the hand writing of the user input in the input window.

Next, one or more recommendations are displayed on a recommendation window 240 of the touch screen by using the hand writing output in step S240. For example, the controller 110 may display one or more recommendations on the recommendation window 240 of the touch screen by using the hand writing output generated in step S230. For example, when the hand writing output that is "case" is generated from the hand writing input 300 that is "case" in step S230, the controller 110 may display one or more recommendations on the recommendation window 240 by using the hand writing output that is "case" as illustrated in FIG. 15B. For example, when the hand writing output is English and the hand writing output is a singular form, the controller 110 may convert the hand writing output into a plural form to display one or more recommendations on the recommendation window 240. For example, when the hand writing output is English "Case" and is a singular form, the controller 110 may display one or more recommendations 244 that is a plural form "Cases" converted from "Case" on the recommendation window 240. Further, the controller 110 may also display one or more recommendations with a correct spelling on the recommendation window 240 by performing a spelling check on the hand writing output. For example, when the hand writing output is "case", the controller 110 may also display one or more recommendations with a correct spelling "case" on the recommendation window by performing a spelling check on the hand writing output.

Next, a selection of the one or more recommendations is detected in step S250. The controller 110 may detect a selection of the one or more recommendations recommended in step S250. The selection of the one or more recommendations may be a touch for the one or more recommendations. For example, when a first recommendation 242 recommended in step S250 is "Case" and a second recommendation 244 recommended in step S250 is "Cases", a selection of the first recommendation 242 or the second recommendation 244 may be detected. In this case, the selection may be the detection of the touch for the one or more recommendations, so that, for example, when the touch that is the selection of the first recommendation 242 is detected in FIG. 15B, the controller 110 may select the first recommendation 242.

When the touch for the one or more recommendations is not detected for several seconds or more, the controller 110 may select the first arranged and displayed recommendation among the sequentially arranged and displayed one or more recommendations. For example, when the first recommendation 242 and the second recommendation 244 are sequentially arranged and displayed as illustrated in FIG. 15B and the touch of the first recommendation 242 or the second recommendation 244 is not detected for several seconds or more, the controller 110 may select the first arranged and displayed first recommendation 242.

Next, the selected recommendation is generated as final hand writing output to be displayed on the output window on the touch screen in step S260. Referring to FIG. 15C, the controller 110 may generate the recommendation selected in step S250 as final hand writing output to display the generated final hand writing output on the output window 210 on the touch screen. For example, the output window 210 corresponds to a window which is displayed on the screen 190 of the mobile apparatus to display the hand writing output 400.

For example, because a note application is executed in the mobile apparatus 100 of FIG. 15C, the controller 110 may generate "Case" that is the first recommendation 242 selected in step S250 as the final hand writing output 246 and display the generated final hand writing output 246 on the output window 210. The final hand writing output 246 displayed on the output window 210 may be stored in the storage unit 175 of the mobile apparatus, for example, as data corresponding to a note.

FIGS. 16A to 16C are diagrams illustrating a seventh example of a method of controlling a mobile apparatus having a hand writing function using a multi-touch according to an exemplary embodiment of the present invention.

Referring to FIG. 14, hand writing input is first detected from a hand writing input window on a touch screen of the mobile apparatus in step S210.

Referring to FIGS. 16A to 16C, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items having functions related to the hand writing may be included in the menu window 230.

Next, multi touch input and single touch input are distinguished in the hand writing input in step S220. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 16A and 16C, the controller 110 may distinguish "A" 350 included in the hand writing input 300 input in the input window 220 through the user input means as multi touch input. For example, the controller 110 may distinguish the hand writing input generated by a multi touch gesture by a user, for example, the gesture of touching the input window 220 in a shape of "A" with two fingers as illustrated in FIG. 16A, as multi touch input 350.

Next, hand writing output including multi touch output corresponding to the multi touch input and single touch output corresponding to the single touch input is generated in step S230. The controller 110 may generate hand writing output including multi touch output corresponding to the multi touch input distinguished in step S220 and single touch output corresponding to the single touch input distinguished in step S220.

For example, the controller 110 may generate the multi touch output 242 corresponding to the multi touch input 350 generated by the multiple touches. In this case, the controller 110 may generate the multi touch output by recognizing writing by comparing the multi touch input with pre-stored writing recognition data included in a writing recognition database. Further, the controller 110 may generate the single touch output by recognizing the writing by comparing the single touch input with pre-stored writing recognition data included in a writing recognition database.

However, in this case, the multi touch input may be a first character, and the multi touch output may be a second character similar to the first character. For example, when the multi touch input is a first character as illustrated in FIG. 16A, the controller 110 may generate the multi touch output corresponding to the multi touch input as a second character similar to the first character. For example, when the multi touch input 350 is detected as "A" as illustrated in FIG. 16A, the controller 110 may recognize the writing as "A" by comparing the multi touch input 350 that is "A" with the pre-stored writing recognition database. However, in this case, when "A" that is the recognized writing is detected as the multi touch input, the controller 110 may generate the multi touch output 252 with "Á" that is a second character similar to "A" as illustrated in FIG. 16B. In this case, the second character similar to the first character may be a character in which, for example, a diacritic, such as """ or "~", is added to the first character.

For example, when the multi touch input is a character, the controller 110 may generate the multi touch output corresponding to the multi touch input as another character similar to the character. Accordingly, when the user desires to input a character, the user may easily input a desired second character similar to a first character by performing a multi touch on the input window. For example, the controller 110 generates the multi touch output corresponding to the multi touch input that is a first character as the second character similar to the first character, thereby improving recognition of the hand writing of the user input in the input window.

Next, one or more recommendations are displayed on a recommendation window of the touch screen by using the hand writing output in step S240. For example, the controller 110 may display one or more recommendations on the recommendation window of the touch screen by using the hand writing output generated in step S230. For example, when the second characters "À", "Á", and "Æ" similar to the first character are generated as the hand writing output from the hand writing input 300 that is the first character "A" of FIG. 16A in step 230, the controller 110 may display a first recommendation 252, a second recommendation 254, and a third recommendation 256 corresponding to the second characters "Á", "Á", and "Æ" on the recommendation window 240 as illustrated in FIG. 16B.

Next, a selection of the one or more recommendations is detected in step S250. The controller 110 may detect a selection of the one or more recommendations recommended in step S250. The selection of the one or more recommendations may be a touch for the one or more recommendations. For example, when the first recommendation 252, the second recommendation 254, and the third recommendation 256 recommended in step S250 are displayed on the recommendation window 240 as illustrated in FIG. 16B, a selection of the first recommendation 252, the second recommendation 254, or the third recommendation 256 may be detected. In this case, the selection may be the detection of the touch for the one or more recommendations, so that, for example, when the touch that is the selection of the first recommendation 252 is detected in FIG. 16B, the controller 110 may select the first recommendation 252.

When the touch for the one or more recommendations is not detected for several seconds or more, the controller 110 may select the first arranged and displayed recommendation among the sequentially arranged and displayed one or more recommendations. For example, when the first recommendation 252, the second recommendation 254, and the third recommendation 256 are sequentially arranged and displayed as illustrated in FIG. 16B and the touch of the first recommendation 252, the second recommendation 254, or the third recommendation 256 is not detected for several seconds or more, the controller 110 may select the first arranged and displayed recommendation which corresponds to first recommendation 252.

Next, the selected recommendation is generated as final hand writing output to be displayed on the output window on the touch screen in step S260. Referring to FIG. 16C, the controller 110 may generate the recommendation selected in step S250 as final hand writing output to display the generated final hand writing output on the output window 210 on the touch screen. For example, the output window 210 corresponds to a window which is displayed on the screen 190 of the mobile apparatus to display the hand writing output 400. For example, because a note application is executed in the mobile apparatus 100 of FIG. 16C, the controller 110 may generate "Á" that is the first recommendation 252 selected in step S250 as the final hand writing output 258 and display the generated final hand writing output 258 on the output window 210. Then, the final hand writing output 258 displayed on the output window 210 may be stored in the storage unit 175 of the mobile apparatus, for example, as data corresponding to a note.

FIGS. 17A to 17C are diagrams illustrating an eighth example of a method of controlling a mobile apparatus having a hand writing function using a multi-touch according to an exemplary embodiment of the present invention.

Referring to FIG. 14, hand writing input is first detected from a hand writing input window on a touch screen of the mobile apparatus in step S210.

Referring to FIGS. 17A to 17C, the input window 220 may be displayed on the screen 190. The input window 220 displayed on the screen 190 of the mobile apparatus 100 formed as the touch screen may receive touch input from the user input means. Accordingly, the controller 110 of the mobile apparatus may detect the hand writing input from the input window 220.

Further, the output window 210 may be displayed on the screen 190. The output window corresponds to a window for outputting and displaying the hand writing input that is input through the input window 220 of the screen 190. The menu window 230 may be displayed on the screen 190. Menu items having functions related to the hand writing may be included in the menu window 230.

Next, multi touch input and single touch input are distinguished in the hand writing input in step S220. The controller 110 may distinguish the multi touch input from the single touch input in the detected hand writing input. In this case, when the plurality of simultaneously input touches is detected from the hand writing input detected from the touch of the user input means, the controller 110 may distinguish the plurality of simultaneously input touches as the multi touch input, and when one general simple touch is detected from the hand writing input, the controller 110 may distinguish the one general simple touch as the single touch input. For example, referring to FIGS. 17A and 17C, the controller 110 may distinguish "O" 360 included in the hand writing input 300 that is input in the input window 220 through the user input means as multi touch input. For example, the controller 110 may distinguish the hand writing input generated by a multi touch gesture by a user, for example, the gesture of touching the input window 220 in a shape of "O" with two fingers as illustrated in FIG. 17A, as multi touch input 360.

Next, hand writing output including multi touch output corresponding to the multi touch input and single touch output corresponding to the single touch input is generated in step S230. The controller 110 may generate hand writing output including multi touch output corresponding to the multi touch input distinguished in step S220 and single touch output corresponding to the single touch input distinguished in step S220.

For example, the controller 110 may generate the multi touch output corresponding to the multi touch input 360 generated by the multiple touches. In this case, the controller 110 may generate the multi touch output by recognizing writing by comparing the multi touch input with pre-stored writing recognition data included in a writing recognition database. Further, the controller 110 may generate the single touch output by recognizing the writing by comparing the single touch input with pre-stored writing recognition data included in a writing recognition database.

However, in this case, the multi touch input may be a first character, and the multi touch output may be a second character similar to the first character. For example, when the multi touch input is a first character as illustrated in FIG. 17A, the controller 110 may generate the multi touch output corresponding to the multi touch input as a second character similar to the first character. For example, when the multi touch input 360 is detected as "O" as illustrated in FIG. 17A, the controller 110 may recognize the writing as "O" by comparing the multi touch input 360 that is "O" with the pre-stored writing recognition database. However, in this case, when "O" that is the recognized writing is detected as the multi touch input, the controller 110 may generate the multi touch output 262 with "Ó" that is a second character similar to "O" as illustrated in FIG. 17B. In this case, the second character similar to the first character may be a character in which, for example, a diacritic, such as "'", """, "~", or "/", is added to the first character. For example, when the multi touch input is a character, the controller 110 may generate the multi touch output corresponding to the multi touch input as another character similar to the character. Accordingly, when the user desires to input a character, the user may easily input a desired second character similar to a first character by performing a multi touch on the input window. For example, the controller 110 generates the multi touch output corresponding to the multi touch input that is a first character as the second character similar to the first character, thereby improving recognition of the hand writing of the user input in the input window.

Next, one or more recommendations are displayed on a recommendation window of the touch screen by using the hand writing output in step S240. For example, the controller 110 may display one or more recommendations on the recommendation window 240 of the touch screen by using the hand writing output generated in step S230. For example, when the second characters "Ó", "Ö", and "Ø" similar to the first character are generated as the hand writing output from the hand writing input 300 that is the first character "O" of FIG. 17A in step 230, the controller 110 may display a first recommendation 262, a second recommendation 264, and a third recommendation 266 corresponding to the second characters "Ó", "Ö", and "Ø" on the recommendation window 240 as illustrated in FIG. 17B.

Next, a selection of the one or more recommendations is detected in step S250. The controller 110 may detect a selection of the one or more recommendations recommended in step S250. The selection of the one or more recommendations may be a touch for the one or more recommendations. For example, when the first recommendation 262, the second recommendation 264, and the third recommendation 266 recommended in step S250 are displayed on the recommendation window 240 as illustrated in FIG. 17B, a selection of the first recommendation 262, the second recommendation 264, or the third recommendation 266 may be detected. In this case, the selection may be the detection of the touch for the one or more recommendations, so that, for example, when the touch that is the selection of the first recommendation 262 is detected in FIG. 17B, the controller 110 may select the first recommendation 262.

When the touch for the one or more recommendations is not detected for several seconds or more, the controller 110 may select the first arranged and displayed recommendation among the sequentially arranged and displayed one or more recommendations. For example, when the first recommendation 262, the second recommendation 264, and the third recommendation 266 are sequentially arranged and displayed as illustrated in FIG. 17B and the touch of the first recommendation 262, the second recommendation 264, or the third recommendation 266 is not detected for several seconds or more, the controller 110 may select the first arranged and displayed recommendation which corresponds to first recommendation 262.

Next, the selected recommendation is generated as final hand writing output to be displayed on the output window on the touch screen in step S260. Referring to FIG. 17C, the controller 110 may generate the recommendation selected in step S250 as final hand writing output to display the generated final hand writing output on the output window 210 on the touch screen. For example, the output window 210 corresponds to a window which is displayed on the screen 190 of the mobile apparatus to display the hand writing output 400. For example, because a note application is executed in the mobile apparatus 100 of FIG. 17C, the controller 110 may generate "Ó" that is the first recommendation 262 selected in step S250 as the final hand writing output 268 and display the generated final hand writing output 268 on the output window 210. Then, the final hand writing output 268 displayed on the output window 210 may be stored in the storage unit 175 of the mobile apparatus, for example, as data corresponding to a note.

It may be recognized that the exemplary embodiments of the present invention may be implemented with hardware, software, or a combination of hardware and software. The predetermined software may be stored in a volatile or non-volatile storage device, such as ROM, a memory, such as RAM, a memory chip, a device, or an integrated circuit, or a storage medium, such as a CD, a DVD, a magnetic disk, or a magnetic tape, which may optically or magnetically records data and is simultaneously readable by a machine (e.g. a computer). Further, it may be recognized that the exemplary embodiments of the present invention may be implemented by a computer or a portable terminal including a controller and a memory, and the memory is one example of a machine readable storage medium appropriate for storing a program or programs including commands for implementing the exemplary embodiments of the present invention. Accordingly, the present invention includes a program including codes for implementing the apparatus or the method defined in the certain claim and a machine (computer and the like) readable non-transitory storage medium for storing the program.

Further, the mobile apparatus may receive the program from a wired or wirelessly connected program providing apparatus and store the received program in a non-transitory memory. The program providing apparatus may include a program including instructions for executing the exemplary embodiments of the present invention, a memory for storing information and the like necessary for the exemplary embodiments of the present invention, a communication unit for performing wired or wireless communication with the mobile apparatus, and a controller for automatically transmitting a corresponding program to a transmission/reception device in accordance with a request of the mobile apparatus.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of controlling a mobile apparatus having a hand writing function using a multi touch, the method comprising:
    displaying a hand writing input that is input to a hand writing input window on a touch screen of the mobile apparatus;
    determining whether a touch input on the hand writing input window is a multi touch input or a single touch input;
    generating a hand writing output including multi touch output corresponding to the multi touch input and single touch output corresponding to the single touch input according to a language of the displayed hand writing input; and
    displaying the generated hand writing output in an output window on the touch screen,
    wherein the generated hand writing output differs from the displayed hand writing input.

2. The method of claim 1, wherein the multi touch input is English, and the multi touch output is a capital letter of the English alphabet.

3. The method of claim 1, wherein the multi touch input is Korean, and the multi touch output is a fortis of a Korean consonant or a diphthong of a Korean vowel.

4. The method of claim 1, wherein the multi touch input is a simplified character of Chinese, and the multi touch output is a traditional character of Chinese.

5. The method of claim 1, wherein the multi touch input is a Katakana character of Japanese, and the multi touch output is a Hiragana character of Japanese, or the multi touch input is a Hiragana character of Japanese, and the multi touch output is a Katakana character of Japanese.

6. The method of claim 1, wherein the multi touch input is one character, and the multi touch output is a plurality of characters.

7. The method of claim 1, wherein the multi touch input is a first symbol, and the multi touch output is a second symbol.

8. The method of claim 1, wherein the multi touch input is a command, and the multi touch output is execution of the command.

9. The method of claim 1, wherein the displaying of the hand writing output comprises:
    displaying one or more recommendations on a recommendation window of the touch screen by using the hand writing output; and
    in response to selecting for the one or more recommendations, generating the selected recommendation as a final hand writing output and displaying the generated final hand writing output on the output window.

10. The method of claim 9, wherein the selection for the one or more recommendations corresponds to a touch for the one or more recommendations.

11. The method of claim 9, wherein the selecting for the one or more recommendations comprises:
    selecting a first arranged and displayed recommendation among sequentially arranged and displayed one or more recommendations when the touch for the one or more recommendations is not detected for several seconds or more.

12. A mobile apparatus having a hand writing function using a multi touch, the mobile apparatus comprising:
    a touch screen configured to display an image; and
    a controller configured to:
        display a hand writing input that is input to a hand writing input window on the touch screen,
        determine whether a touch input on the hand writing input window is a multi touch input or a single touch input,
        generate a hand writing output including multi touch output corresponding to the multi touch input and single touch output corresponding to the single touch input according to a language of the displayed hand writing input, and
        display the hand writing output different from the displayed hand writing input, in an output window on the touch screen.

13. The mobile apparatus of claim 12, wherein the multi touch input is English, and the multi touch output is a capital letter of the English alphabet.

14. The mobile apparatus of claim 12, wherein the multi touch input is Korean, and the multi touch output is a fortis of a Korean consonant or a diphthong of a Korean vowel.

15. The mobile apparatus of claim 12, wherein the multi touch input is a simplified character of Chinese, and the multi touch output is a traditional character of Chinese.

16. The mobile apparatus of claim 12, wherein the multi touch input is a Katakana character of Japanese, and the multi touch output is a Hiragana character of Japanese, or the multi touch input is a Hiragana character of Japanese, and the multi touch output is a Katakana character of Japanese.

17. The mobile apparatus of claim 12, wherein the multi touch input is one character, and the multi touch output is a plurality of characters.

18. The mobile apparatus of claim 12, wherein the multi touch input is a first symbol, and the multi touch output is a second symbol.

19. The mobile apparatus of claim 12, wherein the multi touch input is a command, and the multi touch output is execution of the command.

20. The mobile apparatus of claim 12, wherein the controller is further configured to display one or more recommendations on a recommendation window of the touch screen by using the hand writing output, and in response to selecting for the one or more recommendations, to generate the selected recommendation as a final hand writing output and to display the generated final hand writing output on the output window.

21. The mobile apparatus of claim 20, wherein the selection for the one or more recommendations corresponds to a touch for the one or more recommendations.

22. The mobile apparatus of claim 20, wherein the controller is further configured to select a first arranged and displayed recommendation among sequentially arranged and displayed one or more recommendations if the touch for the one or more recommendations is not detected for several seconds or more.

* * * * *